US007878517B2

(12) United States Patent
von Mayenburg et al.

(10) Patent No.: US 7,878,517 B2
(45) Date of Patent: *Feb. 1, 2011

(54) VEHICLE AXLE APPARATUS

(75) Inventors: Michael von Mayenburg, Lake Oswego, OR (US); Daniel G. Fuchs, Tualatin, OR (US); James V. McHorse, Portland, OR (US); Sean Tabari, Camas, WA (US)

(73) Assignee: Daimler Trucks North America LLC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/236,258

(22) Filed: Sep. 23, 2008

(65) Prior Publication Data

US 2009/0066048 A1 Mar. 12, 2009

Related U.S. Application Data

(62) Division of application No. 10/956,770, filed on Oct. 1, 2004, now Pat. No. 7,445,220.

(60) Provisional application No. 60/542,485, filed on Feb. 6, 2004, provisional application No. 60/566,978, filed on Apr. 29, 2004.

(51) Int. Cl.
    *B62D 3/12* (2006.01)
(52) U.S. Cl. .......................... 280/93.515; 280/124.116; 280/124.152; 280/124.157; 280/124.161
(58) Field of Classification Search ............ 280/93.515, 280/124.17, 124.11, 124.116, 124.128, 124.129, 280/124.131, 124.132, 124.157, 124.161, 280/124.152, 124.149, 124.162, 124.163
See application file for complete search history.

(56) References Cited

U.S. PATENT DOCUMENTS

| 1,657,412 | A | 1/1928 | Schneider |
| 3,306,390 | A | 2/1967 | Jamme |
| 3,426,863 | A | 2/1969 | Hanson |
| 3,547,464 | A | 12/1970 | Drewitz |
| 4,105,050 | A | 8/1978 | Hendrickson et al. |
| 4,128,259 | A | 12/1978 | Trent |
| 4,273,357 | A | 6/1981 | Pashkow |

(Continued)

OTHER PUBLICATIONS

Drawing of steering mechanism offered for sale in the United States more than one year before the earliest priority date applicable to the present application.

(Continued)

*Primary Examiner*—Eric Culbreth
(74) *Attorney, Agent, or Firm*—Klarquist Sparkman, LLP

(57) ABSTRACT

A vehicle axle construction comprises a suspension for supporting the axle from first and second frame rail members. Elongated support members extend forwardly from respective locations along the frame rail members that are rearwardly of the axle and are clamped or otherwise coupled to the axle. A single pivot may be utilized to couple the respective rearmost end portions of the supports to the respective frame members. The forward ends of the supports may be coupled to respective air springs. Desirably, at least a portion of each air spring is positioned forwardly of the axle. In addition, at least one lateral stabilizer rigidifies the suspension. An alternative suspension utilizes leaf springs. A double acting rack-and-pinion steering mechanism may be rigidly coupled to the axle for use in steering the wheels of the vehicle.

12 Claims, 17 Drawing Sheets

U.S. PATENT DOCUMENTS

| | | | |
|---|---|---|---|
| 4,351,404 A | 9/1982 | Igarashi | |
| 4,355,694 A | 10/1982 | Igarashi | |
| 4,361,200 A | 11/1982 | Igarashi | |
| 4,368,793 A | 1/1983 | Igarashi | |
| 4,415,179 A | 11/1983 | Marinelli | |
| 4,465,298 A | 8/1984 | Raidel, Sr. | |
| 4,475,615 A | 10/1984 | Stanek | |
| 4,488,615 A | 12/1984 | Millard | |
| 4,699,399 A | 10/1987 | Jable et al. | |
| 4,733,876 A | 3/1988 | Heider et al. | |
| 4,775,166 A | 10/1988 | VanDenberg et al. | |
| 4,783,096 A | 11/1988 | Ramsey et al. | |
| 4,802,690 A | 2/1989 | Raidel | |
| 4,827,788 A * | 5/1989 | Beer et al. | 74/422 |
| 4,830,057 A | 5/1989 | Hendrickson | |
| 4,923,210 A | 5/1990 | Heider et al. | |
| 4,991,868 A | 2/1991 | VanDenberg | |
| 5,016,906 A | 5/1991 | Cadden | |
| 5,037,126 A | 8/1991 | Gottschalk et al. | |
| 5,078,420 A | 1/1992 | Jable et al. | |
| 5,114,125 A | 5/1992 | Srch et al. | |
| 5,119,933 A | 6/1992 | Taylor | |
| 5,171,036 A | 12/1992 | Ross | |
| 5,232,160 A | 8/1993 | Hendrickson et al. | |
| 5,333,895 A | 8/1994 | Fujan et al. | |
| 5,366,237 A | 11/1994 | Dilling et al. | |
| 5,403,031 A | 4/1995 | Gottschalk et al. | |
| 5,464,245 A | 11/1995 | Vogler | |
| 5,560,641 A | 10/1996 | Vogler | |
| 5,620,194 A | 4/1997 | Keeler et al. | |
| 5,642,896 A | 7/1997 | Pierce et al. | |
| 5,649,719 A | 7/1997 | Wallace | |
| 5,667,240 A | 9/1997 | Mitchell | |
| 5,676,356 A | 10/1997 | Ekonen et al. | |
| 5,720,489 A | 2/1998 | Pierce et al. | |
| 5,785,345 A | 7/1998 | Barlas et al. | |
| 5,810,377 A | 9/1998 | Keeler et al. | |
| 5,833,253 A | 11/1998 | Hess | |
| 5,887,881 A | 3/1999 | Hatch | |
| 5,921,570 A | 7/1999 | Lie | |
| 5,934,404 A | 8/1999 | DeLellis et al. | |
| 5,938,221 A | 8/1999 | Wilson | |
| 5,950,971 A | 9/1999 | Koumbis et al. | |
| 5,975,573 A * | 11/1999 | Belleau | 280/771 |
| 5,996,981 A | 12/1999 | Dilling | |
| 6,007,078 A | 12/1999 | Gottschalk et al. | |
| 6,024,417 A | 2/2000 | Jones, II et al. | |
| 6,073,947 A | 6/2000 | Gottschalk et al. | |
| 6,086,077 A | 7/2000 | Stuart | |
| 6,116,367 A | 9/2000 | Roberts | |
| 6,129,369 A | 10/2000 | Dudding | |
| 6,135,470 A | 10/2000 | Dudding | |
| 6,206,407 B1 | 3/2001 | Fuchs et al. | |
| 6,213,507 B1 | 4/2001 | Ramsey et al. | |
| 6,224,074 B1 | 5/2001 | Cadden | |
| 6,240,806 B1 | 6/2001 | Morris et al. | |
| 6,244,608 B1 | 6/2001 | Hess | |
| 6,264,231 B1 | 7/2001 | Scully | |
| 6,274,848 B1 | 8/2001 | Von Mosshaim | |
| 6,276,392 B1 | 8/2001 | Hendrickson | |
| 6,279,933 B1 | 8/2001 | Ross et al. | |
| 6,293,570 B1 | 9/2001 | Gottschalk et al. | |
| 6,308,591 B1 | 10/2001 | Dankow et al. | |
| 6,375,203 B1 | 4/2002 | Warinner et al. | |
| 6,386,525 B1 | 5/2002 | Stuart | |
| 6,390,485 B1 | 5/2002 | Cadden | |
| 6,394,474 B1 | 5/2002 | Warinner et al. | |
| 6,406,007 B1 | 6/2002 | Wilson | |
| 6,406,008 B1 | 6/2002 | Dudding et al. | |
| 6,412,789 B1 | 7/2002 | Pierce et al. | |
| 6,416,069 B1 | 7/2002 | Ramsey | |
| 6,419,289 B1 | 7/2002 | Batten et al. | |
| 6,425,593 B2 | 7/2002 | Fabris et al. | |
| 6,428,027 B1 | 8/2002 | Stuart | |
| 6,439,587 B2 | 8/2002 | Fabris | |
| 6,460,872 B2 | 10/2002 | Cadden | |
| 6,485,040 B1 | 11/2002 | Dudding | |
| 6,508,482 B2 | 1/2003 | Pierce et al. | |
| 6,516,993 B2 | 2/2003 | Dankow et al. | |
| 6,527,286 B2 | 3/2003 | Keeler et al. | |
| 6,585,286 B2 | 7/2003 | Adema et al. | |
| 6,601,836 B1 | 8/2003 | Dankow et al. | |
| 6,609,764 B2 | 8/2003 | Dudding et al. | |
| 6,616,156 B1 | 9/2003 | Dudding et al. | |
| 6,641,156 B1 | 11/2003 | Barlas et al. | |
| 6,715,778 B2 | 4/2004 | Gottschalk et al. | |
| 6,725,743 B2 | 4/2004 | White | |
| 6,729,434 B2 | 5/2004 | Stevens et al. | |
| 6,752,403 B2 * | 6/2004 | Allen et al. | 280/6.157 |
| 6,752,406 B2 | 6/2004 | Pierce et al. | |
| 6,776,425 B2 | 8/2004 | Britton | |
| 6,808,035 B1 | 10/2004 | Keeler | |
| 6,830,250 B2 | 12/2004 | Cervantez et al. | |
| 6,845,989 B2 | 1/2005 | Fulton et al. | |
| 6,851,689 B2 | 2/2005 | Dudding et al. | |
| 6,859,989 B2 | 3/2005 | Bauer et al. | |
| 6,880,839 B2 | 4/2005 | Keeler et al. | |
| 6,883,813 B2 | 4/2005 | Gottschalk | |
| 6,886,266 B2 | 5/2005 | Kidd et al. | |
| 6,902,176 B2 | 6/2005 | Gottschalk | |
| 6,926,122 B2 | 8/2005 | Wittlinger et al. | |
| 6,945,548 B2 | 9/2005 | Dudding et al. | |
| 7,131,652 B2 | 11/2006 | Ramsey | |
| 7,303,200 B2 | 12/2007 | Ramsey | |
| 7,306,293 B2 | 12/2007 | Redgrave | |
| 7,401,490 B2 | 7/2008 | Copeland et al. | |
| 7,445,220 B2 * | 11/2008 | von Mayenburg et al. | 280/124.116 |
| 2005/0127628 A1 | 6/2005 | Ramsey | |
| 2005/0242540 A1 | 11/2005 | Gottschalk | |
| 2005/0280238 A1 | 12/2005 | Keeler | |
| 2006/0158023 A1 | 7/2006 | Gottschalk et al. | |
| 2006/0170205 A1 | 8/2006 | Ramsey et al. | |
| 2006/0244234 A1 | 11/2006 | Ramsey | |
| 2006/0249923 A1 | 11/2006 | Ramsey | |

OTHER PUBLICATIONS

U.S. Appl. No. 10/956,770, filed Oct. 1, 2004, Office Action dated Feb. 20, 2007.

U.S. Appl. No. 10/956,770, filed Oct. 1, 2004, Office Action dated Jul. 26, 2007.

* cited by examiner

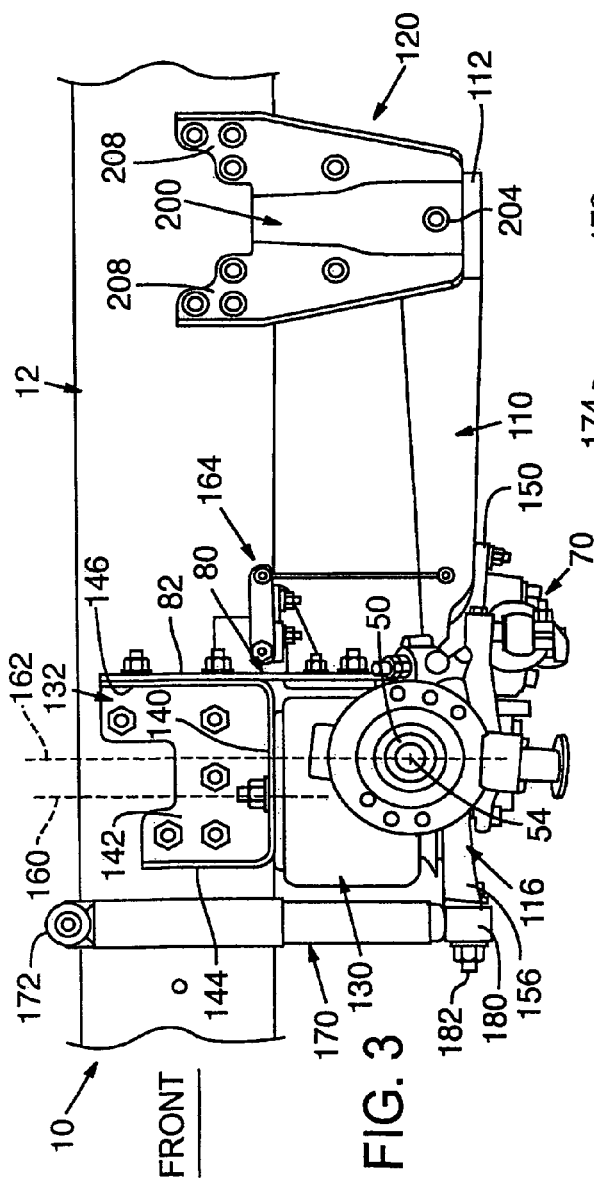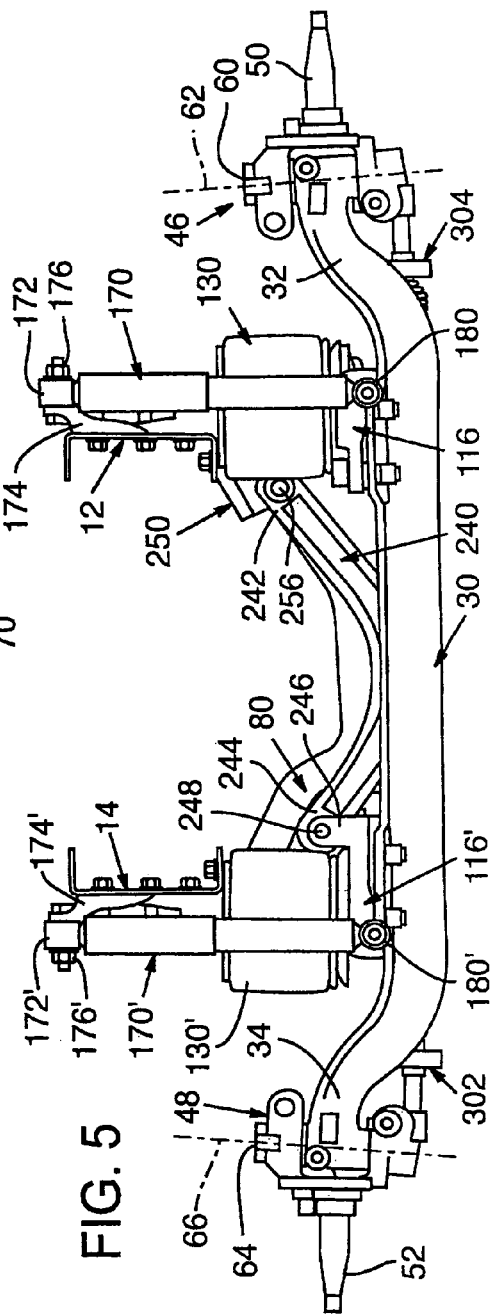

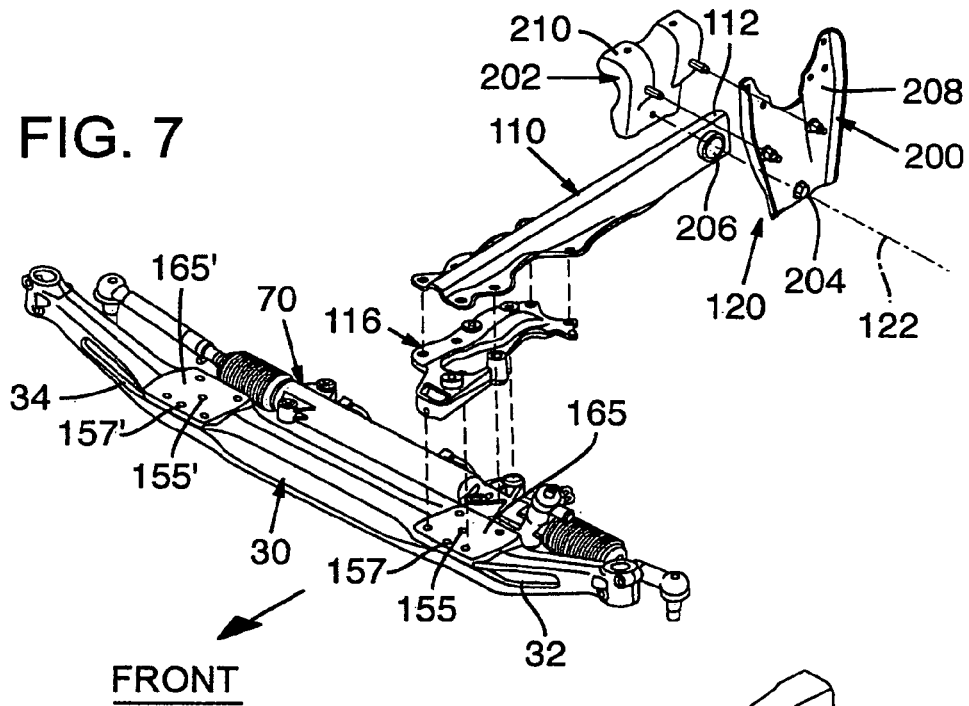
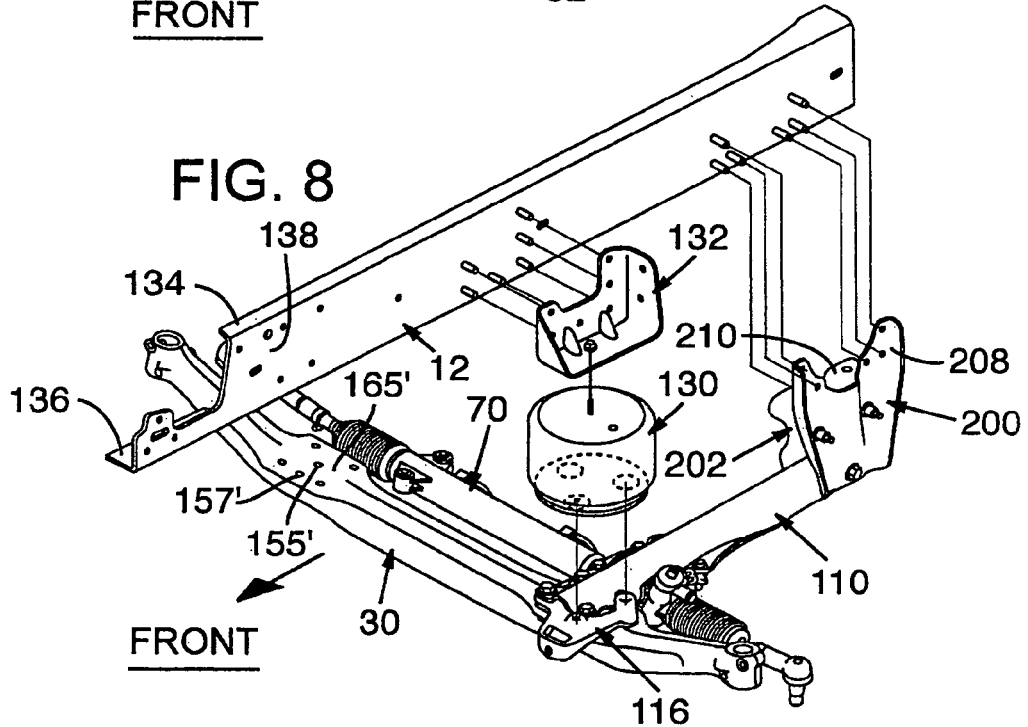

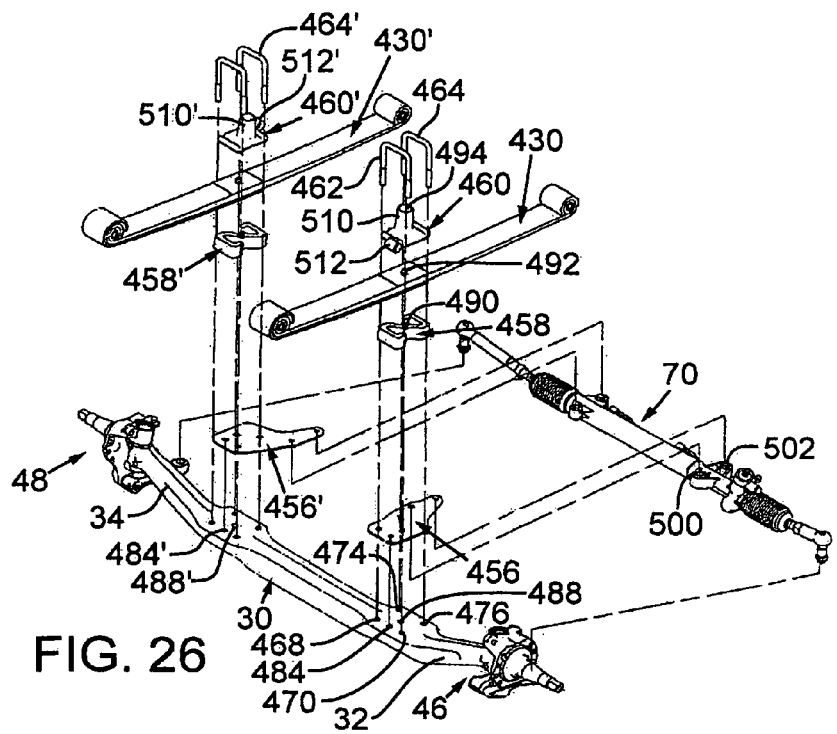
FIG. 26
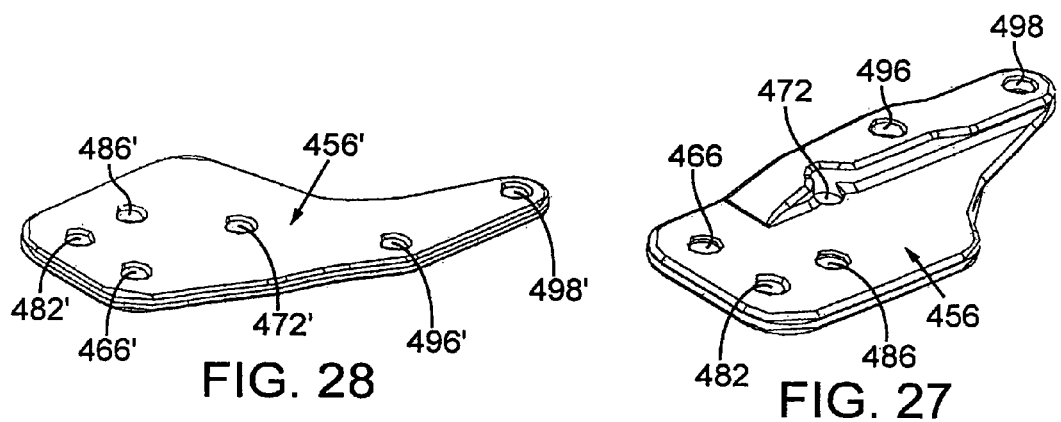
FIG. 28
FIG. 27

VEHICLE AXLE APPARATUS

RELATED APPLICATION DATA

This application is a divisional application of U.S. patent application Ser. No. 10/956,770 filed Oct. 1, 2004 now U.S. Pat. 7,445,220; which claims the benefit of U.S. provisional patent application No. 60/542,485, filed Feb. 6, 2004, entitled, "Vehicle Axle Apparatus", by Michael von Mayenburg, Sean Tabari, James V. McHorse, David A. Sukowatey, Andrew H. Wedam and Matthew G. Markstaller, and U.S. provisional patent application No. 60/566,978, filed Apr. 29, 2004, entitled, "Vehicle Axle Apparatus", by Michael von Mayenburg, Sean Tabari, James V. McHorse, David A. Sukowatey, Andrew H. Wedam and Matthew G. Markstaller, which are hereby incorporated by reference.

TECHNICAL FIELD

The present invention relates to vehicle axle apparatus and has particular applicability to the front steerable axle of a vehicle such as a truck.

BACKGROUND

Various axle suspension mechanisms are known for suspending a vehicle axle from frame rails of a vehicle, such as a truck.

In one known form, the axle of a truck is clamped to an elongated support. The support is pivoted to a frame rail at a location forwardly of the axle and coupled by a double pivot mechanism to the frame rail at a location rearwardly of the axle. An air spring extends between the frame rail and elongated support, at a location rearwardly of the axle. A structure of this type is illustrated in U.S. Pat. No. 6,086,077 to Stuart. Other suspension mechanisms are also known. Although these suspensions exist, a need nevertheless arises for an improved suspension such as for the front axle of a vehicle to which steerable wheels are mounted.

The axle may be a solid axle with wheels rotatably coupled to the respective end portions of the axle for rotating as the vehicle moves. Solid axles have a central portion extending between frame rails of a vehicle and end portions which typically project outwardly beyond the frame rails. A respective wheel support is pivoted to each end of the axle for pivotal movement about an upright axis to steer the wheels mounted to the respective wheel supports. The wheels are rotatably mounted to the wheel supports for rotation as the vehicle is driven. In a simplified form, solid axles are of a one-piece monolithic unitary construction. By monolithic, it is meant that they are not made of a plurality of parts which are assembled into the construction. Although mechanisms are known for steering the wheels mounted to a solid axle, a need exists for improved steering mechanisms for this purpose.

The present invention relates to new and unobvious improvements in vehicle axle mechanisms as set forth in the claims below. The present invention is not limited to vehicle axle constructions which combine all of the features disclosed herein, but instead are directed toward novel and unobvious aspects of the invention both alone and in various combinations and subcombinations with one another.

SUMMARY

In this disclosure, the term "coupled" includes both direct connection and indirect connection through one or more other components. In addition, the term "a", with reference to a particular component, encompasses one or more of the components because the inclusion, for example, of two of the components means that "a" component is present. In addition, the term "including" has the same broad meaning as the term "comprising".

In accordance with one embodiment, a vehicle comprises a solid axle and first and second spaced apart elongated frame rail members from which the axle is suspended. A solid axle desirably provides torsional stiffness to a suspension. The frame rail members each comprise a front or forward end portion nearest to the front of the vehicle and a rear or rearward end portion nearest to the rear of the vehicle. The axle comprises first and second opposed axle end portions. At least one wheel is rotatably mounted to each axle end portion with the wheels being rotatable about a wheel axis.

In one embodiment, a suspension for a solid axle of the vehicle comprises first and second elongated suspension supports, first and second air springs, at least one cross-member and at least one elongated lateral stabilizer member. In this embodiment, the first support comprises a first end portion pivotally coupled to the first frame rail member at a first location rearwardly of the axle. The first support also comprises a second portion coupled to the axle. The second support similarly has a first end portion pivotally coupled to the second frame rail member at a second location rearwardly of the axle and a second portion coupled to the axle. The first air spring is coupled to the first frame rail member and to the first support. Desirably, in this embodiment, at least a portion of the first air spring is positioned forwardly of the axle and wheel axis. In one specific form, the first air spring has a first upright air spring axis which is positioned forwardly of the wheel axis. The second air spring in this embodiment is also desirably coupled to the second frame rail member and to the second support. The second air spring also desirably has at least a portion positioned forwardly of both the axle and of wheel axis. In one specific embodiment, the second air spring has an upright air spring axis which is positioned at a location forwardly of the wheel axis and axle. The cross-member of this embodiment desirably has a first end portion coupled to the first frame rail member adjacent to the first air spring and a second end portion coupled to the second frame rail member adjacent to the second air spring. In a desirable in this embodiment, the lateral stabilizer member has a first end portion positioned nearer to and pivotally coupled to one of the first and second frame rail members and a second end portion pivotally coupled to the axle at a location adjacent to the other of the first and second frame rail members.

The suspension in accordance with an embodiment also comprises a first shock absorber that may be positioned forwardly of the first air spring. The first shock absorber desirably comprises a first end portion pivotally coupled to the first frame rail member and a second end portion pivotally coupled to the axle. This embodiment also comprises a second shock absorber which may be positioned forwardly of the second air spring. The second shock absorber in this embodiment desirably comprises a first end portion pivotally coupled to the second frame rail member and a second end portion pivotally coupled to the axle.

In accordance with an embodiment, at least one cross-member and at least one lateral stabilizer member such as a track member, for example a track rod or track bar, may be positioned at respective locations along the length of the first and second frame rail members with the respective locations desirably being positioned forwardly of the locations where the respective elongated supports are coupled to the frame rail members and rearwardly of any shock absorbers included in the suspension.

In a desirable form, the solid axle includes first and second axle end portions. The vehicle also comprises first and second wheels rotatably coupled to the respective first and second axle end portions, as by first and second wheel supports pivotally carried by the respective axle end portions. The wheels rotate about a wheel axis as the vehicle moves. The first and second wheels are also pivotally coupled to the respective first and second axle end portions, such as by the respective wheel supports, for pivoting about respective first and second upright steering axes and relative to the axle to steer the vehicle. This embodiment desirably comprises a rack-and-pinion wheel steerer coupled to and supported by the axle. The steerer comprises first and second rack-and-pinion end portions respectively coupled, desirably via first and second wheel supports, to the respective first and second wheels. The rack-and-pinion steerer is operable to selectively shift the first and second rack-and-pinion end portions in a first direction to pivot the wheels about the respective first and second steering axes in one direction. The rack-and-pinion steerer is also operable to selectively shift the first and second rack-and-pinion end portions in a direction opposite to the first direction to pivot the wheels about the respective first and second steering axes in a second direction opposite to said one direction.

In a desirable embodiment, the rack-and-pinion wheel steerer is positioned rearwardly of the solid axle. Desirably, the axle shields all but the end most portions of the rack-and-pinion steerer from the front. In accordance with an embodiment, at least one cross-member and at least one lateral stabilizer member may each be positioned at a location along the length of the respective first and second frame rails at a location which is both rearwardly of the axle and forwardly of the rack-and-pinion steerer. In a specific form, the at least one cross-member and at least one lateral stabilizer member may each have a central portion positioned between the axle and rack-and-pinion steerer during at least certain operating positions of the suspension. Desirably, the central portions of the at least one cross-member and of the at least one lateral stabilizer are positioned at an elevation which is below the elevation of the frame rail members.

In accordance with an embodiment, first and second axle couplers are provided. The first and second axle couplers are respectively positioned below, but not necessarily overlaid by, the first and second frame rail members. Each such axle coupler desirably comprises a rearwardly projecting rack-and-pinion supporting portion to which the one end portion of the rack-and-pinion steerer is coupled. Each axle coupler also desirably comprises a forwardly projecting shock absorber supporting portion to which an end portion of a shock absorber is coupled to thereby couple the shock absorber to the associated frame rail member.

In an embodiment, at least one of the first and second axle couplers may comprise a stabilizer coupling portion to which a first end portion of at least one lateral stabilizer member is pivotally coupled so as to thereby pivotally couple the first stabilizer end portion to the axle. The axle coupler may be mounted at least in part to an upper surface of the axle. Also, the stabilizer coupler portion may comprise an upwardly projecting stabilizer mounting portion. The stabilizer end portion that is opposite to the first stabilizer end portion may be pivoted to the at least one cross-member such as at a location adjacent to a frame rail member. As a desirable feature, a cross-member reinforcement may be rigidly coupled to the frame rail member and also to the at least one cross-member at the location where the at least one lateral stabilizer member is pivoted to the at least one cross-member.

In one embodiment, first and second rail coupling brackets may be rigidly supported by the respective first and second frame rail members. The coupling brackets may each comprise an air spring retaining portion coupled to an upper portion of an associated air spring and a cross-member engaging portion. The end portions of the at least one cross-member may be coupled to, and desirably are directly mounted to, the respective cross-member engaging portions and are thereby coupled to the associated frame rail members. The cross-member engaging portions are desirably located rearwardly of air springs and forwardly of the axle.

Support coupling assemblies are each mounted to a respective associated one of the frame rail members. Each support coupling assembly pivotally couples the rear end portion of a respective one of the elongated suspension supports to the associated frame rail member. Desirably, the support coupling assemblies each define a single pivot axis as the only pivot axis about which the end portion of the associated elongated support pivots relative to the associated frame rail member.

In one form, each of the first and second frame rail members may be generally of a C-shaped cross-section having upper and lower flange portions and an upright web portion extending between the flange portions. Each of the support coupling assemblies, in one specific form, comprises one bracket portion that comprises an upwardly projecting flange portion mounted at least in part to the web portion of the associated frame rail member and another bracket portion that comprises a frame rail mounting portion configured for mounting at least in part to the undersurface of the lower flange portion of the associated frame rail member. The pivot axis for the end portion of the associated elongated suspension support is desirably defined between the bracket portions at a location below the lower flange portion of the associated frame rail member.

In one embodiment, at least one elongated lateral stabilizer member comprises a first end portion pivotally coupled to a cross-member at a first location and a second portion pivotally coupled to one of the first and second suspension supports. At least one of the first and second elongated suspension supports may comprise an extension portion which projects forwardly of the axle. In this latter embodiment, the second end portion of the at least one lateral stabilizer is desirably pivotally coupled to, and may be directly pivotally connected to, the extension portion and the first location is at a position of the at least one cross-member that is spaced from end portions of the cross-member.

In desirable embodiments, the suspension comprises only one lateral stabilizer at the location of the suspension. Alternatively, and less desirably, plural lateral stabilizer members may be included in the suspension although this adds weight to the suspension. The elongated suspension supports may be of a plural piece construction. However, in one desirable form, the first and second elongated suspension supports are each of a unitary one-piece monolithic construction such as being cast, stamped, formed or machined out of starting material, with steel being a specific example.

In a further embodiment, the suspension comprises a solid axle with a rack-and-pinion steerer positioned rearwardly of the axle and with the axle coupled to each frame rail by a leaf spring based suspension. The leaf spring may be pivotally coupled to the associated frame rail for pivoting about a single pivot axis at the front of the leaf spring and coupled by linkage to the frame rail at the rear of the leaf spring with the linkage accommodating a double pivot.

Again, the invention is directed toward novel and unobvious aspects of vehicle axle mechanisms described herein both alone and in various subcombinations and combinations with one another, as set forth in the claims. The invention also encompasses novel and unobvious methods comprising combinations and subcombinations of method acts as disclosed herein.

DESCRIPTION OF THE DRAWINGS

FIG. 3 is a side elevational view of the embodiment of FIG. 1.

FIG. 5 is a front elevational view of a portion of the assembly of FIG. 1.

FIG. 7 is a partially exploded view of selected components of an embodiment of a suspension.

FIG. 8 is a partially exploded view of additional components of a suspension together with the assembled components of FIG. 7.

FIG. 26 is an exploded view of components included in the embodiment of FIG. 24.

FIGS. 27 and 28 are enlarged views of respective mounts which may be used to couple the rack-and-pinion steerer to the axle in the embodiment of FIG. 26.

DETAILED DESCRIPTION

Figure 1:
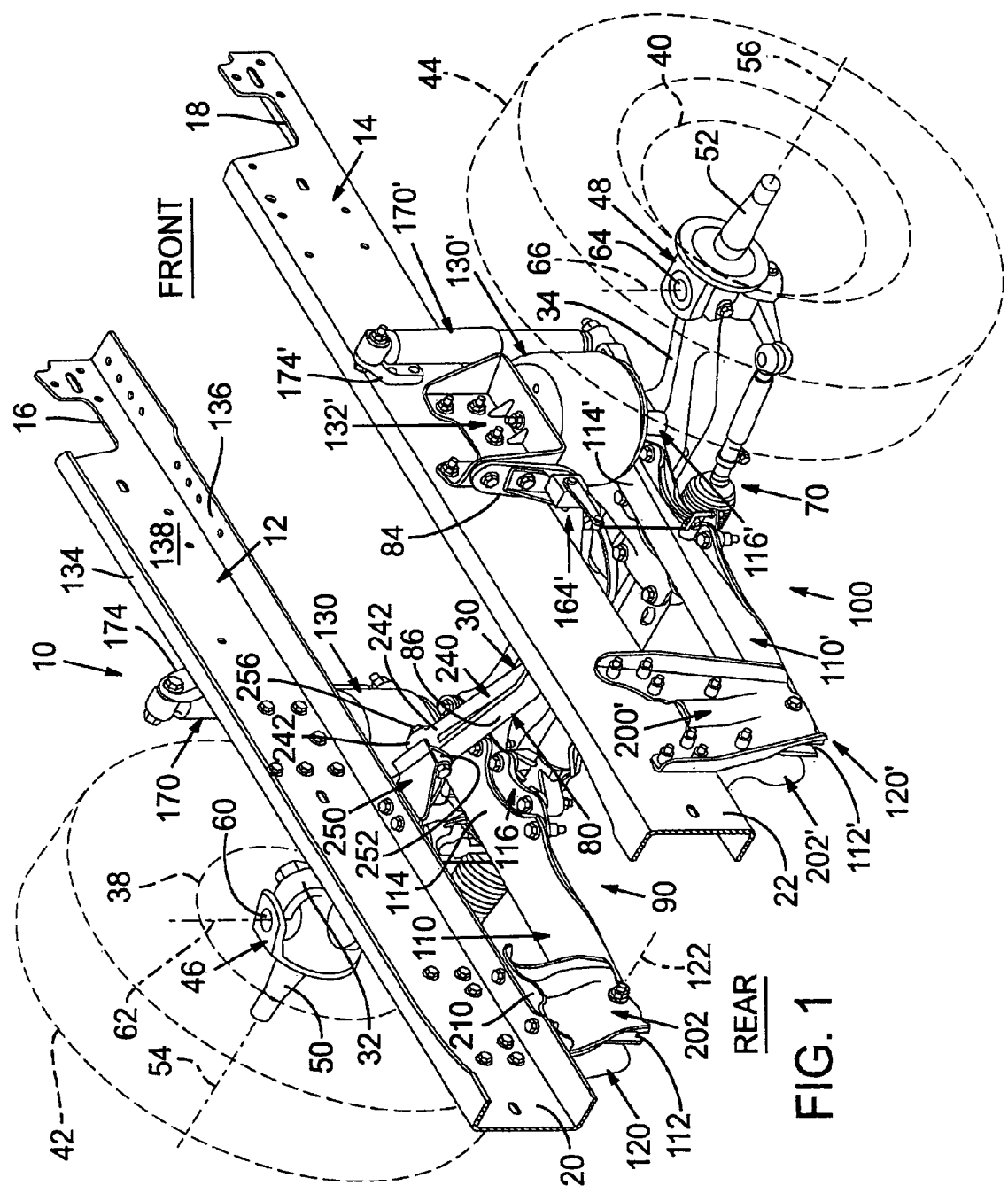
FIGS. 1 and 2 are perspective views of a vehicle front axle suspended from first and second frame rail members in accordance with one embodiment.

With reference to FIGS. 1-6, a vehicle embodiment 10 is illustrated which comprises first and second frame rail members 12,14. The illustrated frame rail members 12,14 comprise sections of spaced apart elongated frame rails of a vehicle such as a truck. Members 12 and 14 may be bolted or otherwise secured to other frame rail components which together form elongated frame rails of a vehicle having a longitudinal axis which extends in a fore and aft direction. Members 12,14 may also comprise complete frame rails rather than frame rail sections, if desired. The sections 12,14 have respective front or forward ends 16,18 and rear or rearward ends 20,22. The word "forward" refers to a direction toward the front of the completed vehicle while the word "rearward" refers to a direction toward the rear of the vehicle. A radiator (not shown in FIG. 1) or radiator supporting brackets (also not shown in FIG. 1) may be mounted to the front ends 16,18 of the respective rail members 12,14.

An axle 30 is positioned below the frame rail members 12,14 and extends transversely relative to the frame rail members. That is, axle 30 extends across the space between frame rail members 12,14 and desirably extends outwardly beyond the frame rail members. For example, in the embodiment of FIGS. 1-6, axle 30 has opposed end portions 32,34 which extend outwardly beyond the outer surfaces of the respective frame rail members 12,14. Most desirably, the axle 30 is perpendicular to the frame rail members. The illustrated axle 30 in this embodiment is a solid axle which spans the distance at least between frame rail members 12,14. The solid axle functions as a torsional stabilizer bar. By solid axle it is meant that the axle is not articulated. Thus, the respective wheels 38,40, and tires 42,44 supported by the respective wheels 38,40, at the respective end portions 32,34 of the axle are not supported by independently upwardly and downwardly movable axle components.

A first wheel support 46 comprises a wheel supporting axle extension 50 to which wheel 38 is rotatably mounted for rotation about a wheel axis 54. The tire 42 is carried by wheel 38 and thus the wheel 38 and supported tire 42 rotate about axle extension 50 and the wheel axis 54 as the vehicle moves. A second wheel support 48 is coupled to axle end portion 34. Wheel support 48 comprises a wheel supporting axle extension 52 to which the wheel 40 is rotatably mounted. The wheel 40, and tire 44 carried by the wheel 40, rotate about axle extension 52 and more specifically about a wheel axis 56 as the vehicle moves. With solid axle 30, the axes 54 and 56 are aligned with one another during normal operation of the vehicle.

In the illustrated embodiment of FIGS. 1-6, the axle 30 comprises the front axle of a vehicle and the wheels 38,40 are steerable to steer the vehicle. It should be noted that the suspension described herein is not limited to an application to the front axle of a vehicle, although this is a most desirable application. In the embodiment shown in these figures, the wheel support 46 is pivotally coupled to axle end portion 32 by a pivot 60 for pivoting about an upright pivot or steering axis 62 (shown in FIGS. 1 and 5). Also, the wheel support 48 is pivotally coupled by a pivot 64 (FIGS. 1 and 5) for pivoting about an upright pivot or steering axis 66.

Although various steering mechanisms may be used to pivot the wheel supports 46,48 about the steering axes 62,66, desirably a rack-and-pinion steering assembly comprising a rack-and-pinion steerer 70, such as described in greater detail below, is provided for this purpose.

Figure 2:
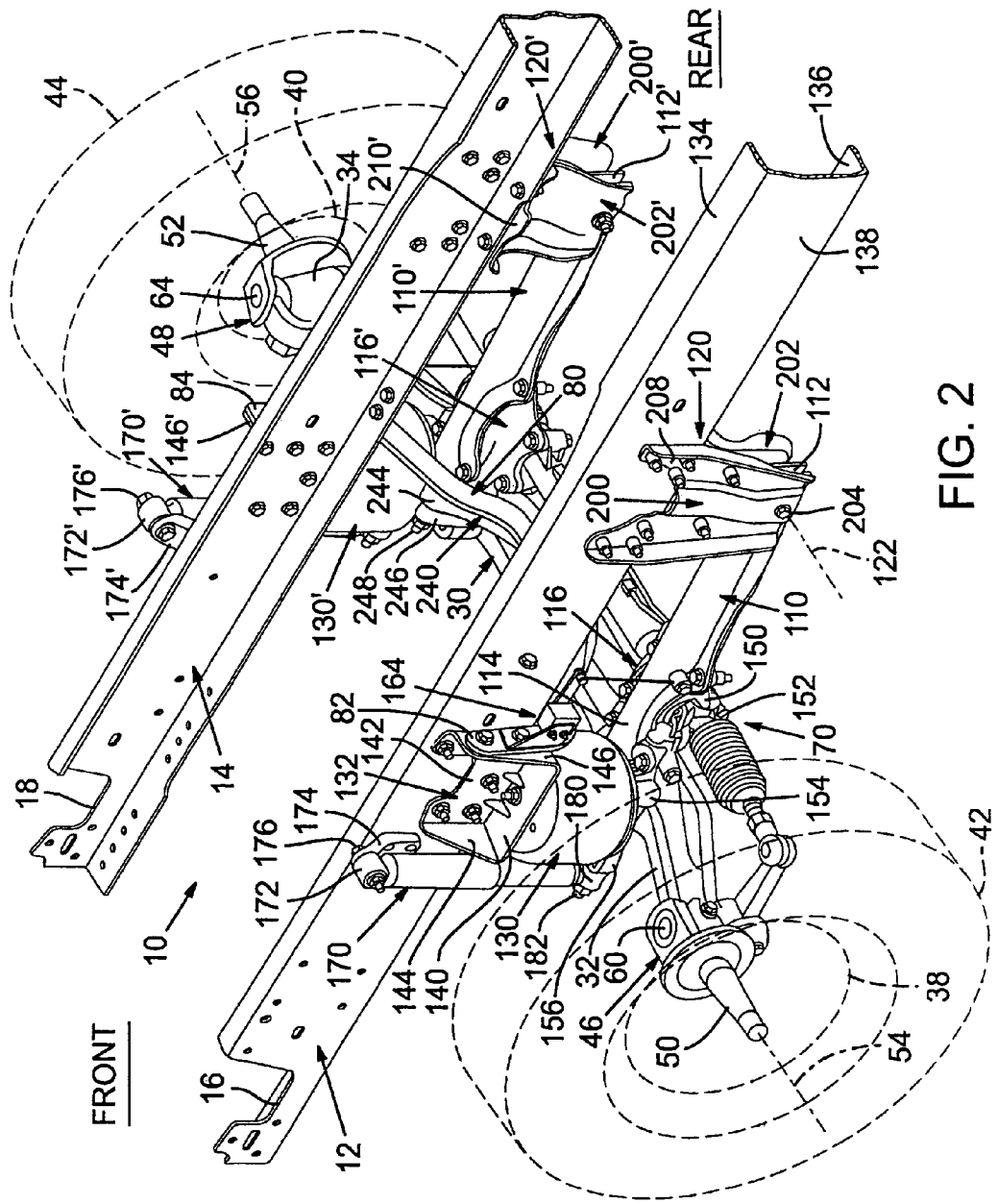

The illustrated vehicle 10 desirably comprises at least one transversely extending cross-member 80 which interconnects the frame members 12,14. Additional cross-members may be provided. In the embodiment of FIG. 1, only one such cross-member is desirably used and is positioned near the axle 30. The cross-member 80 may be generally U-shaped (see for example FIG. 9) to provide clearance for an engine or other components of the vehicle. Respective end portions 82,84 of the illustrated cross-member 80 are coupled to the respective frame rail members 12,14. More specifically, as shown in FIGS. 1 and 2, the end portions 82,84 extend upwardly along the outside surfaces of the respective frame rail members 12,14 for coupling thereto as explained below. An intermediate or central portion 86 (FIG. 1) of the cross-member 80 is positioned below the frame rail members and is desirably positioned in the space rearwardly of axle 30 and forwardly of rack-and-pinion steerer 70.

As previously mentioned, the solid axle 30 is positioned below and is spaced from the frame members 12,14 by the vehicle suspension. One embodiment of a suspension, indicated generally at 90 in FIG. 1 for frame member 12, is provided for coupling the axle to the respective frame member 12. A similar suspension 100 is desirably used to couple the axle 30 to the frame member 14.

In the form of suspension 90 illustrated in FIGS. 1-6, a first elongated suspension support 110 is provided and extends in a fore/aft direction. The illustrated support 110 desirably has a longitudinal axis which is parallel to the longitudinal axis of frame member 12. The support 110 may be of a plural piece construction but, desirably, is of a single piece configuration and may be formed by, for example, stamping. In this example, in the event of excessive impact, support 110 would tend to buckle or bend rather than break. In this example, the support 110 is a monolithic one piece component. By monolithic, it is meant that there are no welds or other assemblies of plural components to form the support 110. The illustrated support 110 comprises a body having a first end portion 112 pivotally coupled to frame rail member 12 at a location rearwardly of axle 30. In addition, support 110 comprises a second portion 114, which may comprise an end portion of support 110, which is coupled to the axle 30. For example, a clamp or more desirably an axle coupler, one form of which is indicated at 116 in FIG. 1, may be used to rigidly clamp or connect the body of elongated support 110 to the axle 30 so as to prevent fore/aft sliding of the support 110 relative to the axle 30.

In the embodiment shown in FIGS. 1-6, the rearmost end portion 112 of support 110 is coupled to the frame rail 12 by a support assembly 120 such that support end portion 112 pivots about a pivot axis 122 relative to the frame rail 12. Pivot axis 122 is desirably parallel to the wheel axis 54. Most desirably, and although not required, the support 110 pivots relative to frame rail member 12 about only a single pivot axis, in this case pivot axis 122. That is, a double pivot connection is eliminated in this illustrated embodiment. The support assembly 120 in the illustrated embodiment is desirably bolted or otherwise rigidly secured to frame member 12 and will be described in greater detail below. In the illustrated example, the rearward positioning of support 110 frees up the front end of the frame rails to accommodate vehicle components such as a larger radiator.

A first air spring 130 is coupled at an upper portion thereof to frame rail 12 and at a lower portion thereof to the axle 30. The lower portion of air spring 130 may be coupled to the axle through another component, such as by axle coupler 116. Although the air spring 130 may be coupled to the frame rail 12 in any convenient manner, in one desirable approach, a rail coupling bracket, such as indicated at 132 in FIG. 2, is rigidly supported by and mounted to the first frame rail member 12. More specifically, the frame rail member 12 may be of a C-shaped cross-section having upper and lower flange portions 134,136 and an upright web portion 138 extending between the flange portions 134,136. The illustrated rail coupling bracket 132 comprises a first air spring retaining portion, such as an outwardly projecting flange 140, coupled to an upper portion of air spring 130. The rail coupling bracket 132 may also comprise a back portion 142 mounted to the web 138 of frame rail 12. Fore-and-aft gusset or reinforcing portions 144,146 may also be included in the bracket 132 for interconnecting back 142 and flange 140 to reinforce the flange. Other reinforcing gussets may also be provided to strengthen bracket 132. Desirably, the portions 144,146 extend outwardly from web 138 and perpendicularly to the web. The rail coupling bracket 132 also desirably comprises a cross-member engaging portion which, in the illustrated embodiment, comprises the reinforcing flange 146. In the illustrated embodiment, the upper end portion 82 of cross-member 80 is bolted or otherwise rigidly secured to flange 146. Thus, bracket 132 performs a dual function of retaining the upper portion of air spring 130 and providing a connection for cross-member 80. In addition, the orientation of flange 146, that is the projection of flange 146 outwardly from web 138, facilitates the connection of the cross-member to the bracket 132. The cross-member may be flat stock as shown in FIG. 2 with the front surface of end portion 82 of cross-member 80 abutting the rear surface of bracket portion 146 for convenient mating of these components together as they are connected.

The axle coupler 116 (described in greater detail below) may be of a plural piece construction but, in the form shown, the illustrated exemplary axle coupler is a single piece monolithic element which may be cast or otherwise made. The illustrated axle coupler 116 desirably comprises a rearwardly projecting portion 150 (FIG. 2). Projecting portion 150 comprises one form of a rack-and-pinion supporting portion to which a first end portion 152 of the rack-and-pinion steerer 70 may be coupled. In addition, the elongated suspension support 110 may also be coupled or mounted to the axle coupler portion 150 to rigidify the assembly at this location. A central portion 154 of axle coupler 116 is desirably coupled to the axle 30 such as by being bolted or otherwise rigidly secured thereto. The lower portion of air spring 130 may also be supported by the central portion 154 of axle coupler 116. In addition, the axle coupler 116 may comprise a forwardly projecting shock absorber supporting portion, such as in a form indicated at 156, for purposes explained below. Clamps and other mechanisms may be used in alternative approaches for mounting the air spring in the suspension. The air spring 130 is desirably detachably mounted in place. The dashed line 160 shown in FIG. 3 coincides with an upright or center axis of air spring 130. In the illustrated embodiment, the center line or axis 160 is positioned forwardly of wheel axis 54. A vertical plane extending through wheel axis 54 is indicated by dashed line 162 in FIG. 3. Thus, in the embodiment shown in FIG. 3, at least a portion of the air spring 130 is positioned forwardly of the axle. This position of air spring 130 provides space for other components located rearwardly of the air spring. Also, by shifting air springs forwardly, the loading on the air springs is reduced, which permits the use of smaller air springs. Air spring 130 may be shifted to locations other than that shown in FIG. 3 (such as rearwardly over axle 30 or further to the rear). A conventional leveling valve assembly 164 (FIG. 3) and associated controls operate in a conventional manner to control the inflation of air spring 130 such as to level the frame member 12.

As best seen in FIGS. 2 and 3, a shock absorber 170 is desirably provided to dampen the motion of the elongated support 110. The illustrated shock absorber 170 comprises an upper end portion 172 which is pivotally coupled to the frame rail 12. For example, a mounting bracket 174 (FIG. 2) rigidly secured to web 138 of frame rail 12 may support the upper end 172 of shock absorber 170 for pivoting about a transversely extending pivot axis defined by the axis of a pin 176. The lower end 180 of shock absorber 170 is pivoted to shock absorber supporting portion 156 of axle coupler 116 by a pin 182 for pivoting about an axis which is generally parallel to frame rail 12. Shock absorber 170 is desirably positioned forwardly of the axle and in effect along an extension of support 110 due to the coupling of the support 110 to axle coupler 116. Enhanced shock absorption is provided by this arrangement because the shock absorber 170 is spaced a substantial distance from the pivot axis 122 about which support 110 pivots relative to frame rail 12. Shock absorber 170 thus effectively dampens out vibrations in the suspension.

The rear end portion 112 of support 110 may be coupled to frame member 12 in any suitable manner for pivoting relative to the frame rail. Desirably, coupling is accomplished so as to limit the pivoting of end portion 112 of support 110 about a single pivot axis. Again, a support mechanism such as support coupling assembly 120 may be used for this purpose. The illustrated support assembly 120 (see FIG. 2) comprises first and second bracket portions 200,202 which are configured to receive the end portion 112 of support 110 therebetween. A bolt or pin 204, carrying a bushing (not shown), is coupled to end portion 112 and defines the pivot axis 122. As best seen in FIG. 7, a bushing receiving opening 206 extends through end portion 112 of support 110. The illustrated bracket 200 comprises an upwardly projecting flange portion 208 mounted at least in part to the web portion 138 of the first frame rail member 12. The second bracket portion 202 comprises a frame rail mounting portion 210 (FIGS. 7 and 8), configured for mounting at least in part to the undersurface of the lower flange 136 of the first frame rail member. The pivot 122 is thus defined between the first and second bracket portions 200,202 at a location below the lower flange portion 136 of frame rail member 12.

Figure 9:
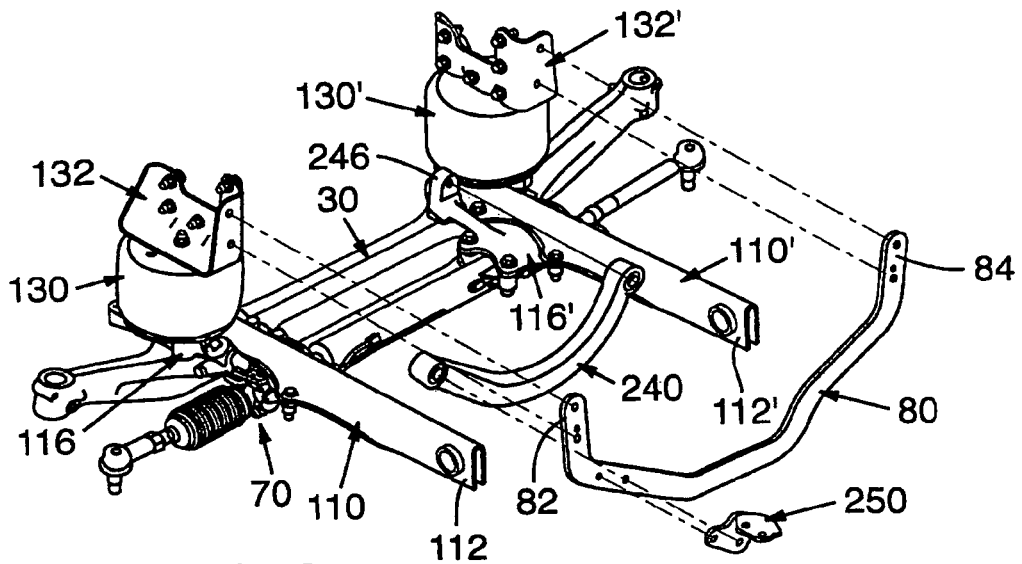
FIGS. 9 and 10 are partially exploded views of the suspension of FIGS. 7 and 8 with additional components depicted therein.
Figure 10:
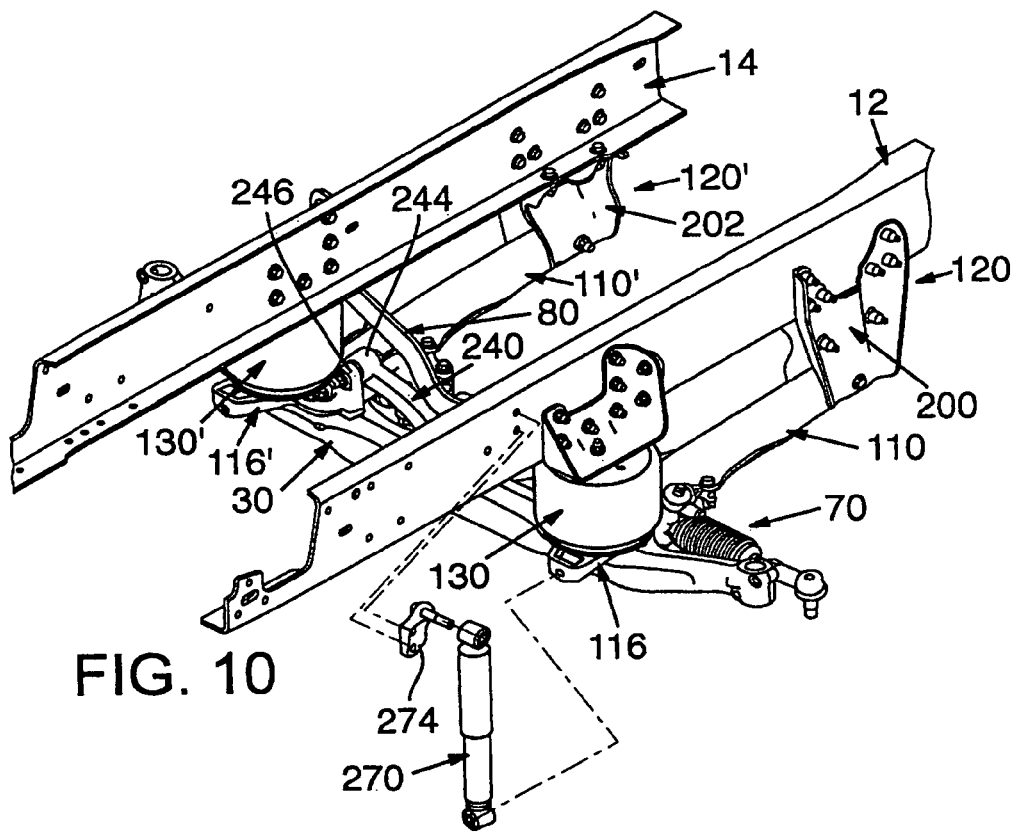

The suspension desirably comprises at least one elongated lateral stabilizer member, with one example being indicated at 240 in FIGS. 1, 2 and 4-6. While more than one lateral stabilizer may be used, in a desirable construction only one is provided. The illustrated elongated lateral stabilizer member 240 has a first end portion, such as 242, coupled to one of the first and second frame rail members (in this example end portion 242 (FIG. 1) is coupled to frame rail member 12). In addition, a second end portion, such as 244 (FIG. 2) is pivotally coupled to the axle 30 at a location adjacent to the other of the first and second frame rail members (in this case adjacent to frame rail member 14). In the embodiment of these figures, end portion 242 of stabilizer member 240 is pivoted to the cross-member 80 at a location intermediate the end portions 82,84 of the cross-member and more specifically at a location at the interior of frame rail 12. In addition, end portion 244 is pivoted to the axle 30 via the axle coupler 116' (see FIG. 2). More specifically, in the illustrated embodiment, the axle coupler 116' comprises a stabilizer coupling portion 246 to which end 244 is pivoted by a pin 248. Thus, in this example, the end portion 244 is indirectly pivoted to the axle through the coupler 116'. Alternatively, the lateral stabilizer 240 may be reversed with end 244 being pivoted to a coupler 116 adjacent to frame rail 12 and end 242 of the coupler then being pivoted to the cross-member adjacent to frame rail 14. The stabilizer portion 246 projects upwardly from coupler 116' in the illustrated embodiment and that is positioned inwardly of frame rail 14. As best seen in FIG. 9, stabilizer 240 in the illustrated form has a central portion which is positioned lower than the end portions 242,244 and is positioned below the lower portions of the frame rails 12,14 so as not to interfere with an engine or other vehicle components positioned between the frame rails at this location. In the illustrated embodiment of FIG. 10, the central portions of cross-member 80 and of stabilizer 240 are positioned between axle 30 and rack-and-pinion steerer 70 with the stabilizer 240 being located forwardly of the cross-member 80.

The suspension may also comprise a cross-member reinforcement, such as a bracket 250 (FIG. 1) rigidly mounted to the frame rail 12. In the FIG. 1 embodiment, bracket 250 is mounted to the lower flange 136 of the frame rail 12. Bracket 250 projects inwardly from frame rail 12 and comprises a reinforcing portion 252 positioned to back up the location at which stabilizer end portion 242 is pivoted to the cross-member 80. More specifically, a pivot pin 256 extends through end 242, the cross-member 80 and reinforcing portion 252 to pivotally interconnect these components at this location.

The respective end portions 242,244 of stabilizer 240 are desirably pivoted about axes which are parallel to the longitudinal axes of the respective frame rails 12,14.

As previously mentioned, a suspension, in this case suspension 100, is also used at the opposite side of the vehicle to couple the axle 30 to the frame member 14. This latter suspension may be identical to the suspension 90 (see FIGS. 1 and 2) and for this reason is not described in detail. In FIGS. 1-6, suspension components corresponding to those which have previously been discussed are indicated by the same number together with a prime (') designation. Not all of the components of suspension 100 have been numbered. Although the support 110' may extend forwardly to the same extent as the support 110, these components need not necessarily be of the same length. For example, as explained in connection with another embodiment described below, one of these supports may be extended a greater amount than the other to provide a forward end portion to which a lateral stabilizer may be pivoted.

FIGS. 7-10 depict the embodiment of FIGS. 1-6 in various stages of assembly. It should be understood that the components need not be assembled in the order shown in these figures. These figures are intended to assist in illustrating a specific embodiment of the suspension with the invention not being limited to this depicted embodiment.

Figure 11:
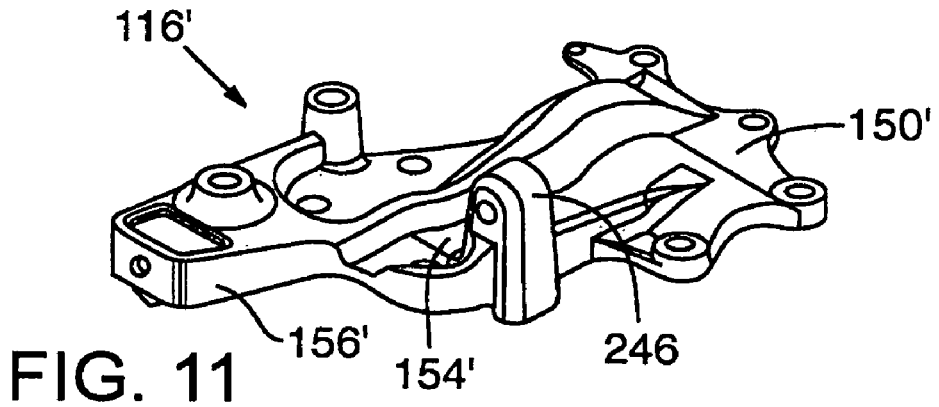
FIG. 11 is a perspective view of one form of axle coupler.
Figure 12:
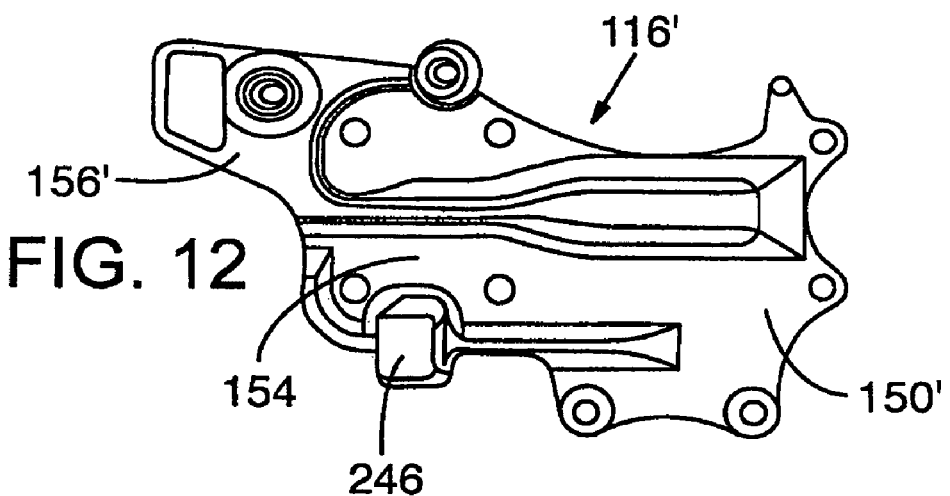
FIG. 12 is a top view of the coupler of FIG. 11.
Figure 13:
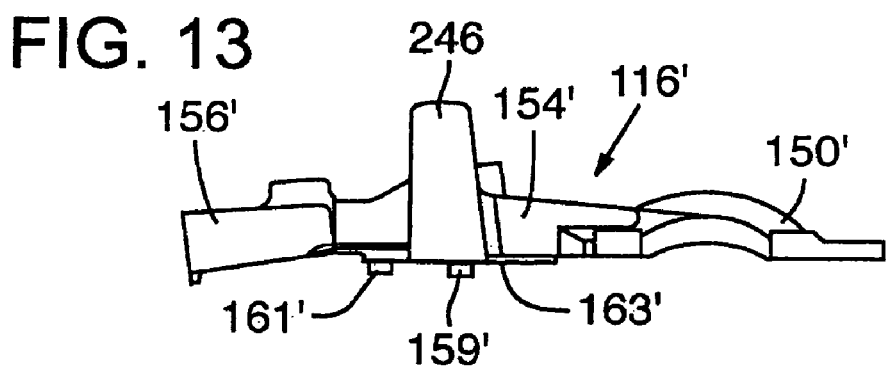
FIG. 13 is a side elevational view of the coupler of FIG. 11.
Figure 14:
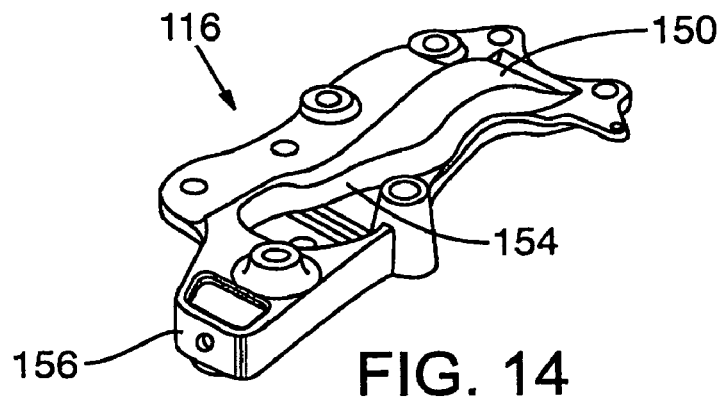
FIG. 14 is a perspective view of another form of axle coupler.
Figure 15:
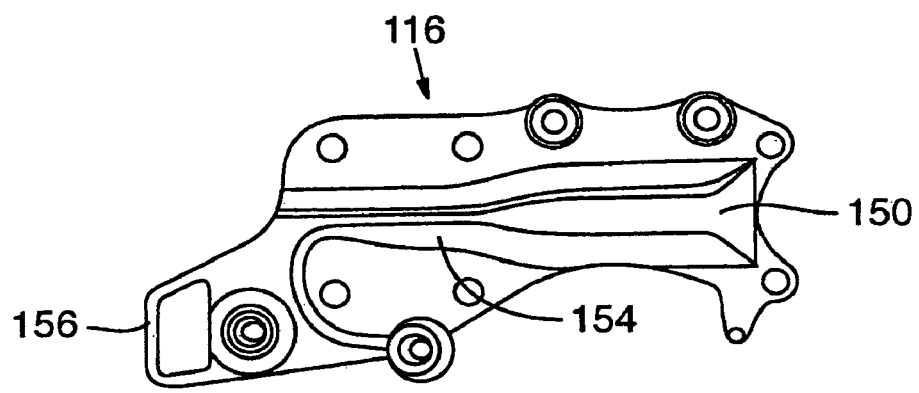
FIG. 15 is a top view of the axle coupler of FIG. 14.
Figure 16:
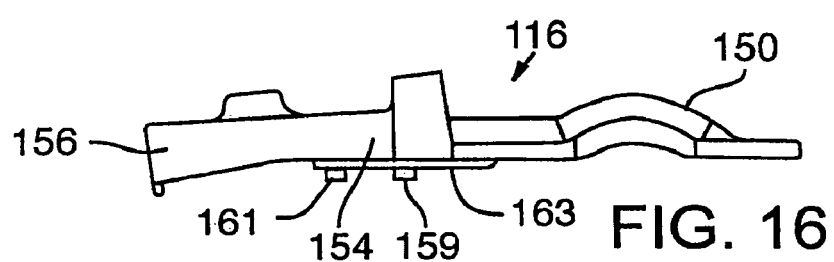
FIG. 16 is a side elevational view of the axle coupler of FIG. 14.

FIGS. 11-13 depict various views of one embodiment of a coupler 116' with portions thereof discussed above. FIGS. 14-16 illustrate a form of coupler 116. One of the differences between these two forms of couplers is that coupler 116 in the illustrated form lacks a stabilizer coupler portion 246.

Desirably, the couplers 116,116' are precisely located on axle 30 with tight tolerances so that, when the rack-and-pinion steerer is mounted to the couplers, a tight tolerance is also provided between the rack-and-pinion steerer and axle. In one specific alignment approach, a centering hole 155 (FIG. 7) is provided through axle 30. Hole 155 may be in the form of a recess extending partially through the axle. The hole 155 may be centered in the bolt receiving pattern through the axle and can be off-center if desired. In addition, a locating hole 157, which may also be in the form of a recess, is provided such as in line and centered between the two forward clamping bolt receiving holes through the axle. Holes 155,157 may be at other locations as they define two locating references for locating the coupler 116. The underside of coupler 116 may include a flat or planar axle engaging undersurface 163 (FIG. 16) for positioning on top of a corresponding flat or planar axle mounting surface 165 (FIG. 7) at or adjacent to axle end portion 32. A first centering peg or pin 159 (FIG. 16) projects downwardly from surface 163. A second locating peg or pin 161 also projects downwardly from this surface. When coupler 116 is in position on axle 30, pin or peg 159 (FIG. 16) is inserted into centering hole 155 (FIG. 7). In addition, pin or peg 161 (FIG. 16) is positioned in hole 157 (FIG. 7). Desirably, the tolerances for the locations of holes 155,157 and pegs or pins 159,161 is very tight. For example, the center of centering hole 155 and of pin 159 may be located within plus or minus 0.5 mm and the center of locating hole 157 and peg or pin 161 may be located within plus or minus 0.1 mm. In addition, the diameters of the respective pins 159,161 and holes 155,157 may be within plus or minus 0.25 mm. With this construction, when coupler 116 is positioned on axle 30, the coupler is precisely located. In addition, since in this embodiment the rack-and-pinion steerer is mounted to the coupler 116, the rack-and-pinion steerer is also therefore precisely positioned. A similar centering hole 155' and locating hole 157' (FIG. 7) cooperates with a respective centering pin or peg 159' (FIG. 13) and a respective locating pin or peg 161' (FIG. 13) to precisely locate coupler 116'.

Again, axle couplers are not limited to these configurations and may be formed of plural pieces, although the illustrated construction is desirable. In addition, the various components of the coupler may take forms other than those shown in these figures while still performing functions such as mounting to an axle, supporting a rack-and-pinion steerer, supporting an air spring and pivotally supporting a shock absorber. In addition, the functions of the couplers may be performed by a single component or may be separated into plural spaced apart discrete components. For example, separate rack-and-pinion steering mounts may be used in addition to or instead of rack-and-pinion supporting portions of the couplers 116, 116'. Furthermore, mirror images of these couplers may be utilized, for example, if the lateral stabilizer orientation shown in FIGS. 1 and 2 is shifted end-for-end.

Figure 4:
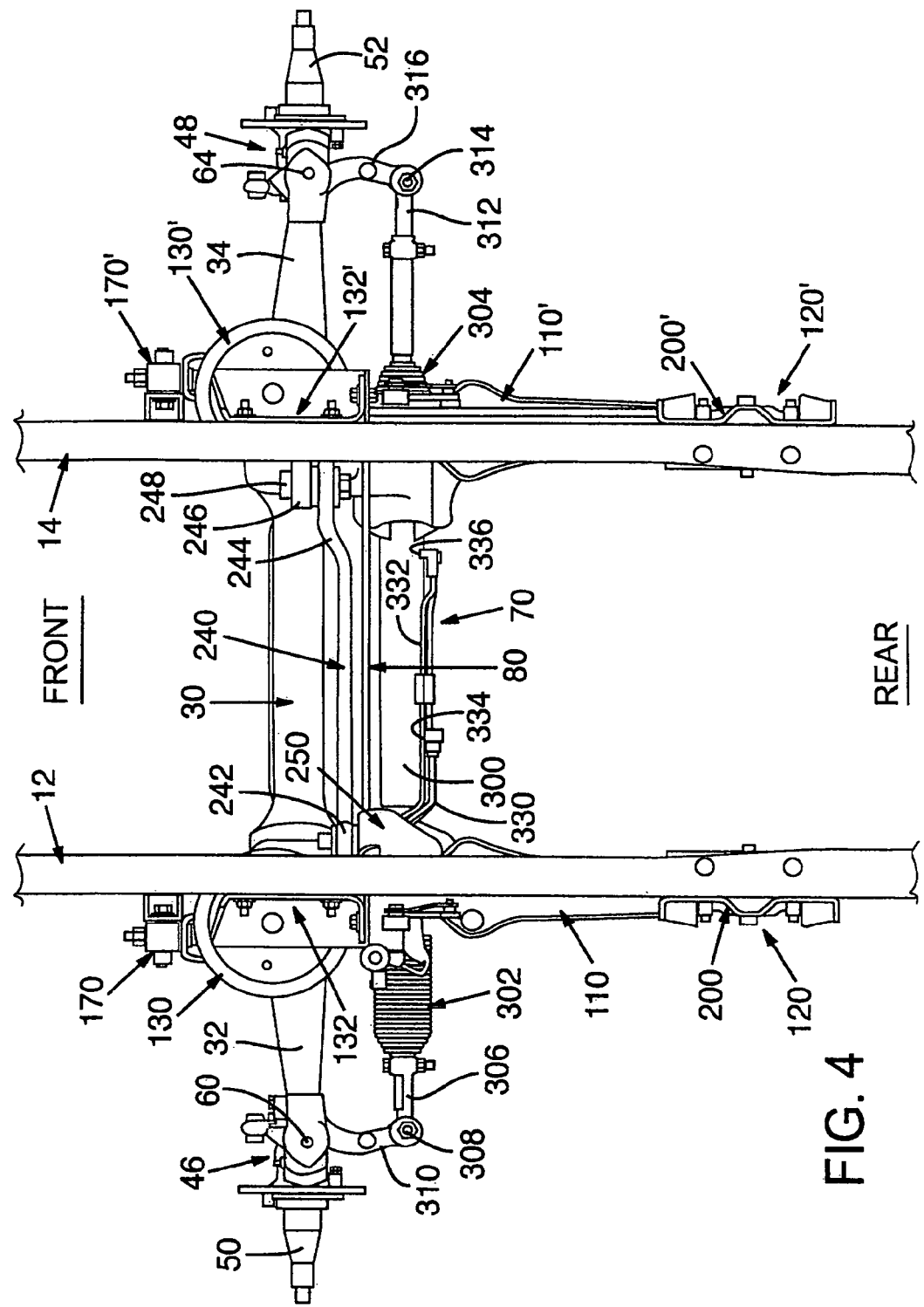
FIG. 4 is a top view of the embodiment of FIG. 1.
Figure 6:
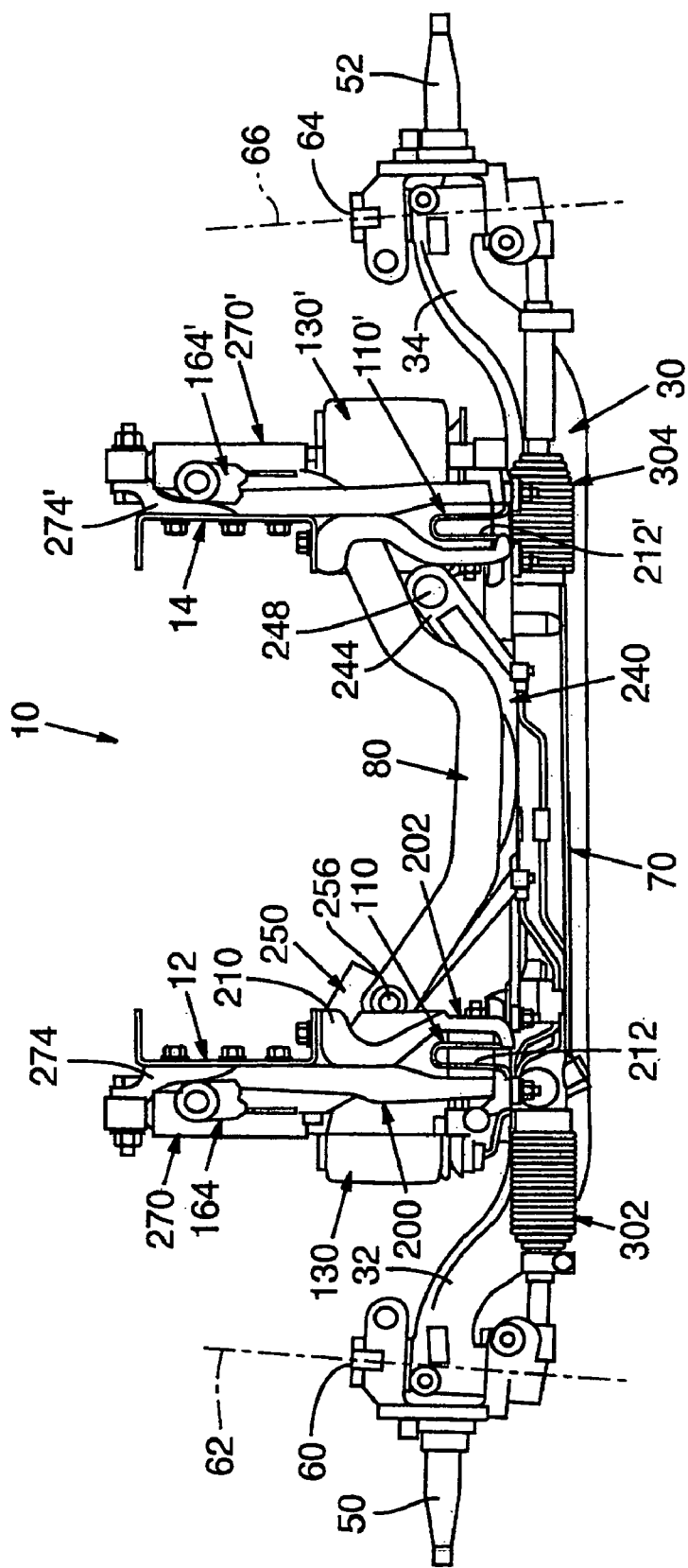
FIG. 6 is a rear elevation view of a portion of the assembly of FIG. 1.
Figure 17:
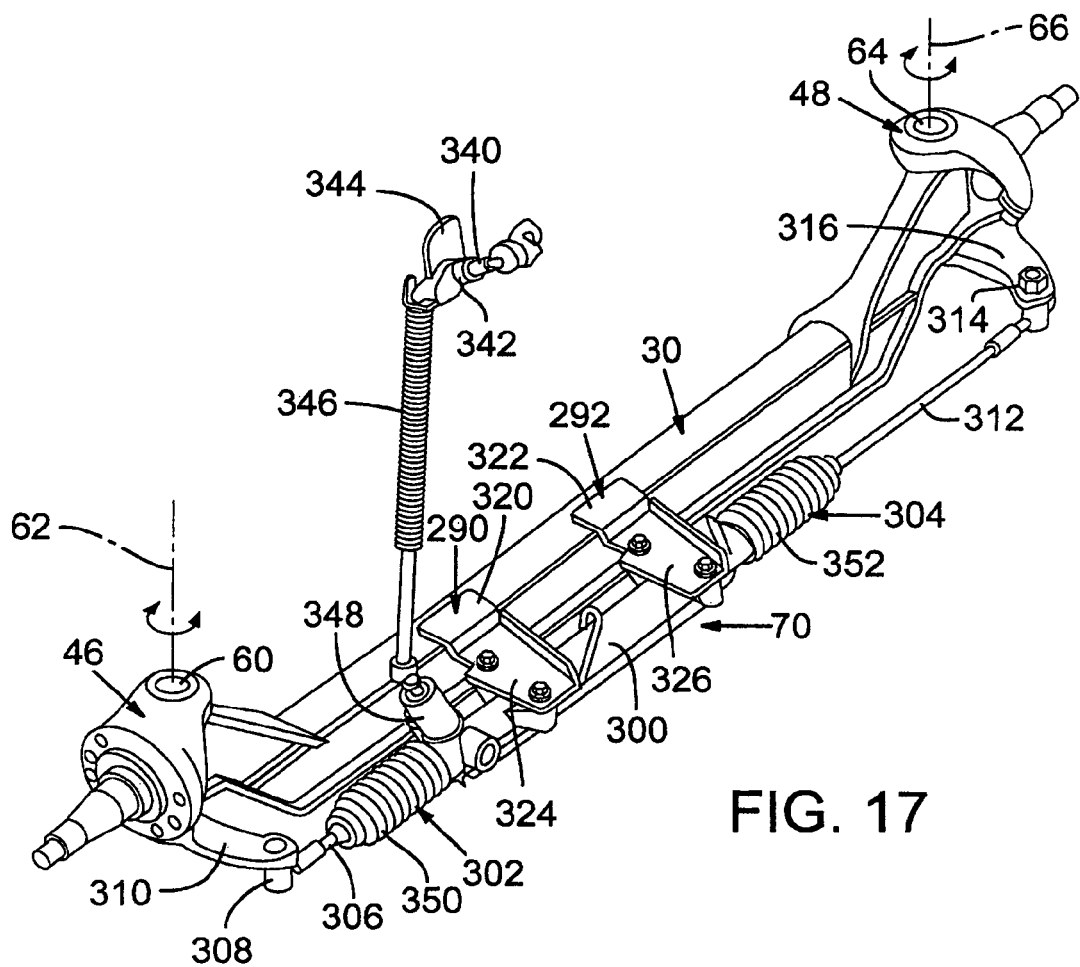
FIG. 17 is a perspective view of an embodiment of an axle with a rack-and-pinion steering mechanism similar to the rack-and-pinion steering mechanism of FIG. 1 (but with a suspension omitted for clarity).

With reference to FIGS. 4 and 17 (and also visible in other figures), the axle assembly may also comprise a steering mechanism which desirably is in combination with a suspension system such as disclosed herein. A desirable form of steering mechanism comprises a rack-and-pinion steering assembly 70. In the embodiment of FIG. 17, mounting brackets 290,292 are utilized for coupling the rack-and-pinion steering assembly to the solid axle 30 instead of utilizing portions 150,150' of axle couplers 116,116' of FIGS. 1-6. The assembly 70 comprises a double-acting rack-and-pinion steering mechanism 300 having respective first and second end portions 302,304. A projecting rod portion 306 of end portion 302 is pivoted at 308 to a rearwardly extending projection, such as to a knuckle portion 310, of wheel support 46. A projecting rod portion 312 extends outwardly from end portion 304. Rod portion 312 is pivoted at 314 to a rearwardly extending projection, such as to a knuckle portion 316, of the wheel support 48. These components are also visible in FIG. 4.

Desirably, the steering mechanism is shielded from the front by the solid axle. More desirably, the rack-and-pinion mechanism is substantially entirely shielded by the axle from the front. As can be seen in the embodiment of FIG. 5, the axle 30 is in front of the rack-and-pinion steerer with only portions of the end portions 302,304 of the rack-and-pinion (and in particular portions of the rod end portions) being visible when looking straight onto the axle from the front of the vehicle. (See also FIG. 6).

Referring again to FIG. 17, the mounts 290,292 comprise respective base portions 320,322 that are bolted, welded or otherwise fastened to axle 30. These base portions are mounted in the FIG. 17 example to an upper surface of axle 30. The bracket 290 comprises a rearwardly extending rack-and-pinion steerer supporting portion 324 which, in this example, comprises a flange that overlays and supports the wheel steerer 70 from above. A rearwardly projecting portion 326 of bracket 292 similarly supports the other end portion of steerer 70. Bolts or other fasteners may be used to couple the wheel steerer 70 to the projecting portions 324,326. The rack-and-pinion steerer 300 of assembly 70 may be like a commercially available rack-and-pinion mechanism, such as a Model LZS3, which has been modified by enlarging and strengthening the components (e.g., seals, ports, rack, and rods) for use in a truck axle mounted application. Model LZS3 rack-and-pinion mechanisms have been available from Mercedes-Benz Corporation and are now available from Thyssenkrupp Presta SteerTec GmBH.

In operation, as a steering wheel (not shown) is turned in a first direction, the rod end portions 306,312 shift together in one direction. This in turn, via the coupling knuckle portions 310,316, pivots the respective wheel supports 46,48 in a first direction to turn the wheels of the vehicle in a direction opposite to the first direction. Turning the steering wheel in the opposite direction reverses the direction of motion of the end sections 306,312 and steers the vehicle in the opposite direction. For example, if end portions 306,312 shift linearly to the right in FIG. 17, the wheel supports 40, 48 pivot in a counterclockwise direction about the steering axes 62, 66 to steer the vehicle to the left in this figure. Conversely, turning the steering wheel in the opposite direction shifts ends 306, 312 in the opposite direction (e.g., to the left) and pivots wheel supports 46,48 oppositely (e.g., clockwise) about the respective steering axes 62,66 to steer the vehicle wheels in the opposite direction. As the steering wheel is turned, hydraulic fluid is delivered from a pump to one port or the other of the rack-and-pinion wheel steerer 300 (e.g., see hydraulic lines 330,332 and ports 334,336 in FIG. 4) to provide a power assist to the steering mechanism. The steering wheel is coupled to a steering stub shaft 340 (FIG. 17) which is connected to a bearing 342 carried by a support 344. The support 344 may be mounted to the a firewall of the vehicle. The stub shaft 340 is also coupled to a steering shaft 346 which is coupled at its lower end to a valve actuator 348. As the shaft 346 rotates, the valve actuator controls a valve to deliver hydraulic fluid to the appropriate side of a cylinder for a power steering assist. Desirably, the shaft 346 is a telescoping shaft with one section received within another section. The sections are slidable relative to one another to accommodate the motion of the suspension, but do not rotate relative to one another. A commercially available I-shaft, such as #7025 474731 from ZFlenksysteme (ZFLS North America), is an example of shaft 346. In addition, a rack within rack-and-pinion steering mechanism 300 is shifted in the direction determined by the direction of rotation of the steering wheel. Rubber boots 350, 352 protect the rack-and-pinion steerer against the influx of dust and the like.

In one exemplary mechanism a universal joint couples the upper end of shaft 346 to a bearing 342. The bearing 342 is supported by a bearing support carried by the firewall mounting assembly 344. The stub shaft 340 is coupled to bearing 342. In one embodiment, the firewall mounting assembly comprises a base portion, which may be of metal or other durable material, mounted to a firewall. An overstress relieving member of the assembly 344 is mounted to the base and carries the bearing support. In the unlikely event that the sections of shaft 346 seize up and prevent relative telescoping motion between the shaft sections to accommodate motion of the suspension, the overstress relieving member is designed to break so as to permit the bearing support and bearing to move relative to the a firewall to accommodate the motion of the suspension without damaging the rack-and-pinion steering mechanism. As a result, vehicle steering is maintained as the steering wheel remains coupled to the rack-and-pinion steerer. The base may comprise a member that encircles the bearing 342 and stub shaft 340 such that the base protects a firewall from damage by confining the motion of the steering mechanism in the event the overstress relieving member breaks away. Although the overstress relieving member may be made of any suitable material that will break when a threshold of stress is reached, one specific example is nylon with a high glass content (e.g., nylon 6 with 30 percent or more glass content) so that it is relatively brittle and tends to shatter when the break-away force is reached. An exemplary break-away force would be 700 pounds, although this can be varied. The glass content of the nylon can be varied to adjust the break-away force. The overstress relieving member may, for example, be injected molded and may alternatively be of plastic or other polymer materials. A multi-piece construction for any of these components may be used. In addition, the break-away feature may be built directly into a firewall without, for example, the use of an assembly 344 or base member, although this would be less desirable. The exemplary break-away feature is exemplary and is not required.

The rack-and-pinion steerer of FIG. 17 may be used with any of the suspensions described herein.

Desirably, the rack-and-pinion steerer 300 is mounted directly to the axle 30 so that the steering mechanism moves up and down with the axle. One benefit of this construction is that the bump steering effect otherwise present in traditional pitman arm and drag link designs is eliminated. This construction also results in a reduction in the stress on the ends 306,312 of the rack-and-pinion steerer by reducing the extreme angular motion through which these components may otherwise travel. This design also results in a significant weight savings over other steering mechanisms which utilize a Pitman arm, steering gear and drag link.

Figure 18:
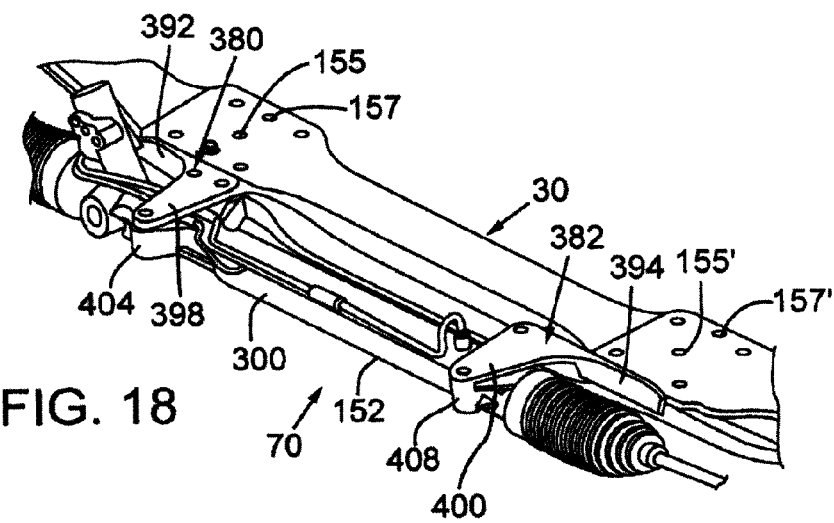
FIG. 18 is a perspective view of another form of axle and rack-and-pinion steering mechanism usable with a suspension system such as shown in FIGS. 1 and 2.
Figure 19:
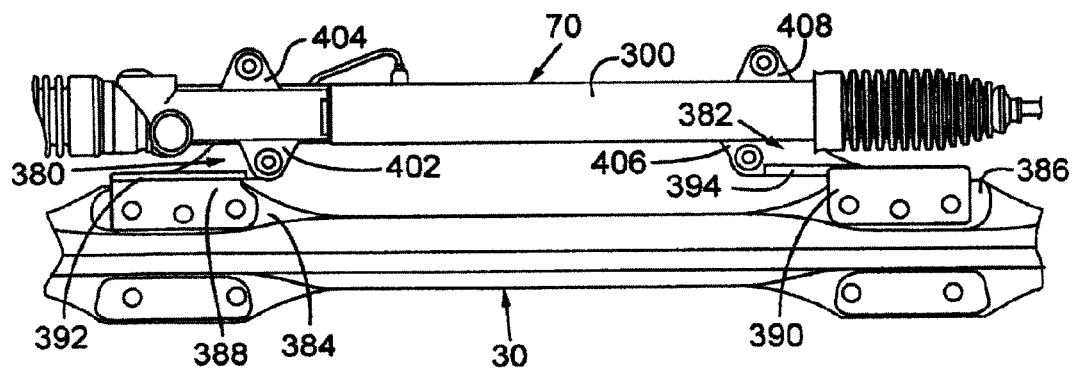
FIG. 19 is a bottom view of the embodiment of FIG. 18.
Figure 20:
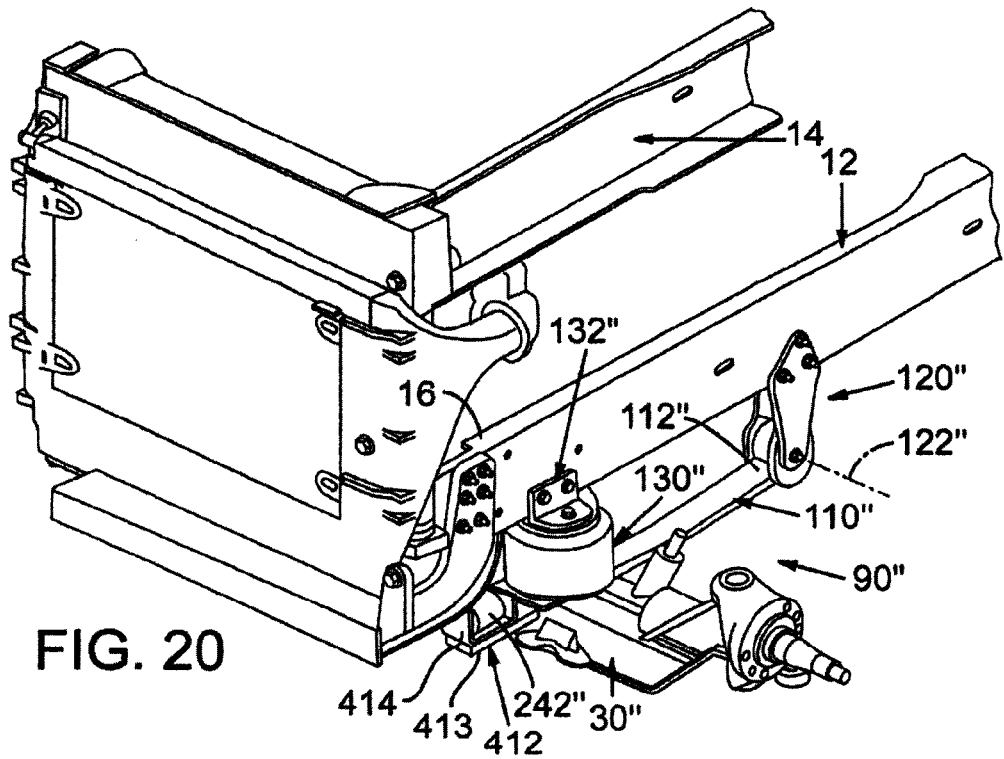
FIG. 20 is a perspective view of a vehicle front axle suspended from first and second frame rail members in accordance with another embodiment.
Figure 21:
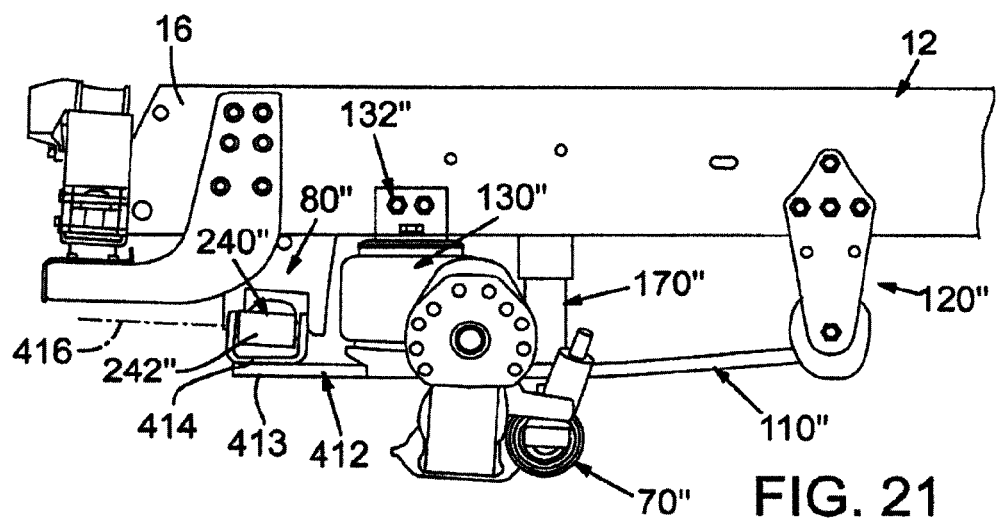
FIG. 21 is a side elevational view of the embodiment of FIG. 1, including a shock absorber.

FIGS. 18 and 19 illustrate other types of mounting brackets 380,382 to provide additional examples of various mounting techniques which may be used to mount the steering mechanism 300 to the axle 30. In the embodiments of FIGS. 18 and 19, the axle 30 is provided with respective spaced apart mounting shelves 384,386 which may be, for example, of a generally planar flange-like configuration. A base 388 of the bracket 380 is configured for mounting to the undersurface of shelf 384. In addition, a base 390 of the bracket 382 is configured for mounting to the undersurface of shelf 386. Bolts or other fasteners may be used for this purpose. As can be seen in FIG. 18, with this construction the brackets do not overlie the upper surface of axle 30. Alternatively, the brackets may overlie the axle. Centering holes or recesses 155,155' and locating holes or recesses 157,157' such as discussed above in connection with FIG. 7 may match corresponding centering holes and locating holes or recesses in mounting brackets (for receiving fasteners) or locating pins or pegs in such brackets for use in precisely mounting the mounting brackets in place. In addition, centering holes and mounting holes or pegs may be provided for the form of bracket shown in FIG. 18. The brackets 380,382 have respective upwardly extending riser portions 392,394 with rearwardly extending flange portions 398,400 projecting from the upper end portions of the riser portions 392,394. The upper surfaces of flange portions 398, 400 may be flush with the upper surface of axle 30. The rack-and-pinion steerer 300 may have mounting projections (e.g., 402,404 at one end portion thereof and 406,408 at the other end portions thereof) with the flanges 398,400 being connected, as by bolts (not shown) or other fasteners to the rack-and-pinion steerer mounting projections.

In the embodiment of FIGS. 20-23, components which are similar to those shown in the FIGS. 1-6 embodiment are given identical numbers to those in FIGS. 1-6 except with a double prime ("). In addition, in general only the suspension 90" is numbered in these figures.

In the embodiment of FIGS. 20-23, elongated support 110" is pivotally coupled to frame rail 12 for pivoting about a single pivot axis 122". The rear end portion 112" of support 110" is bent at its end to form a circular opening for receiving a bushing that is supported between inner and outer brackets of the illustrated coupling assembly 120". A forward portion of support 110" is mounted to the axle 30", such as by interconnected upper and lower clamps, the lower clamp being shown as 410 in FIG. 22. In the embodiment of these figures, the lower portion of an air spring 130" is secured to an extending portion 412 of the elongated support 110" which projects forwardly of the axle. A forwardmost end portion of support 110" is indicated at 413 in FIG. 21.

Figure 22:
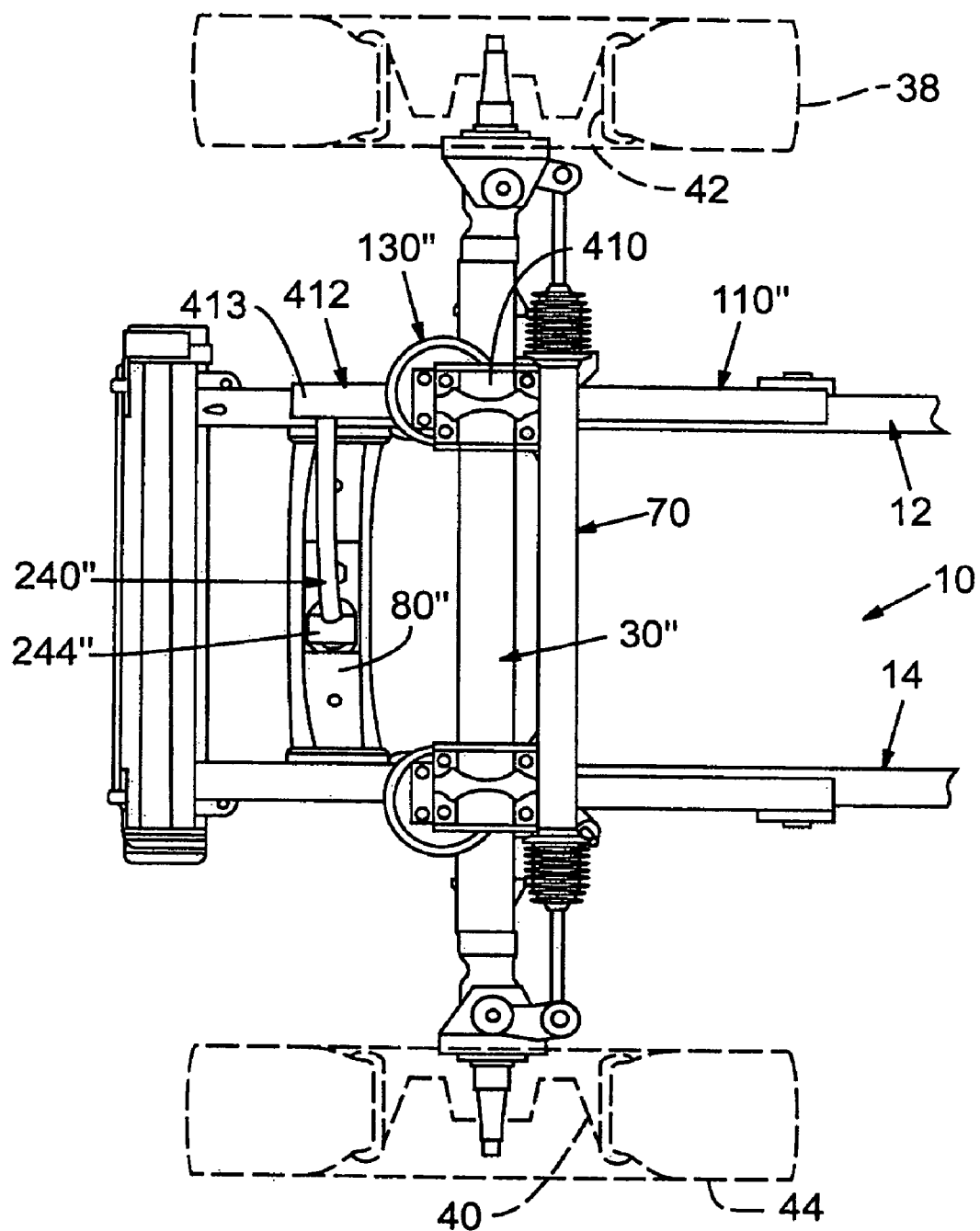
FIG. 22 is a bottom view of the embodiment of FIG. 1.
Figure 23:
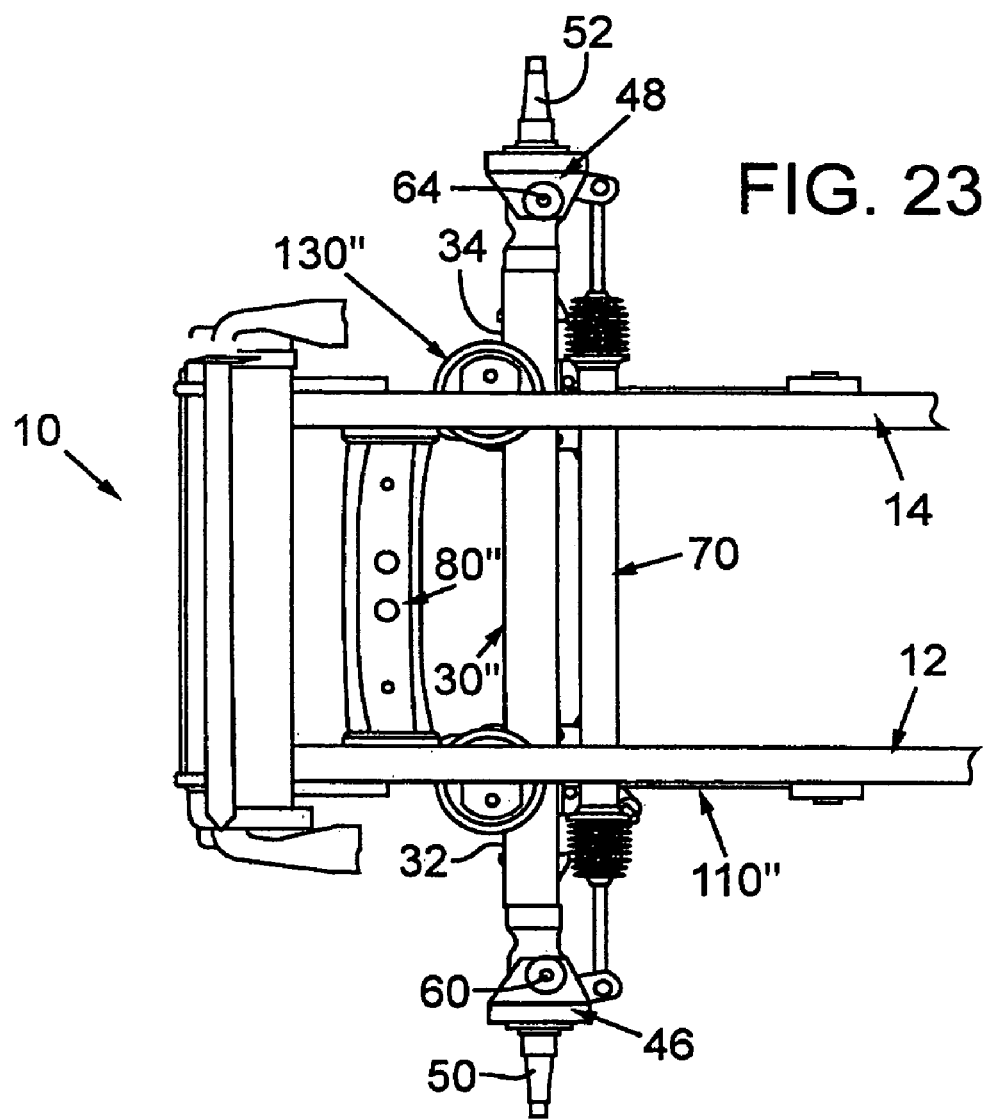
FIG. 23 is a top view of the embodiment of FIG. 20.

As best seen in FIG. 22, in this embodiment a cross-member 80", which may be of a C-shaped configuration with a central portion positioned lower than its end portions, has respective first and second end portions coupled to the respective frame rails 12,14 such as by bolts or other fasteners. The central portion of the cross-member 80" may, for example, comprise an engine supporting cradle. In addition, in this embodiment, although more than one lateral stabilizer may be used, an exemplary lateral stabilizer 240" has a first end portion 242" coupled to the end portion 413 of extension 412 of elongated support 110". As a specific example, stabilizer end portion 242" is pivotally coupled to a bracket 414 carried by the extension end 413. The bracket 414 includes spaced apart upwardly extending leg portions and a base portion. The end portion 242" is pivotally supported between the upwardly extending bracket legs and pivots about a pivot axis 416 (FIG. 21) which extends desirably in a fore-aft direction and parallel to the longitudinal axis of frame rail 12. The end portion 242" of the stabilizer 240" may be formed to define a circular opening for receiving a bushing with a pivot pin coupling the bushing to the bracket 414. The opposite end 244" (FIG. 22) of the illustrated stabilizer 240" is pivoted to cross-member 80" at a location intermediate to the ends of the cross-member. End 244" is desirably pivoted to the cross-member at a location which is nearer to frame rail member 14 than frame member 12.

In the embodiment of FIGS. 20-23, the cross-member 80" and stabilizer 240" are positioned forwardly of the axle. More than one cross-member and stabilizer may be used in the FIGS. 20-23 embodiment. In this embodiment, one of the elongated supports is shorter than the other, although this is not required. That is, the longer elongated support provides a coupling location for the lateral stabilizer 240". One form of radiator support and radiator (unnumbered) is also shown in the FIGS. 20-23 embodiment.

Optional shock absorbers, such as shock absorber 170" (FIG. 21) may be included in the suspension of FIGS. 20-23. For convenience, shock absorber 170" is only shown in FIG. 21, it being understood that a similar shock absorber is desirably included in the suspension at the opposite frame rail 14. In this embodiment, shock absorber 170" is shown positioned rearwardly of the axle. At this location, the shock absorber provides less of a dampening effect than when positioned forwardly of the axle as shown in the FIGS. 1-6 embodiment.

Another embodiment of a suspension and rack-and-pinion steering mechanism is shown in FIGS. 24-31. Elements in common with those in the embodiment of FIG. 1 have been assigned the same numbers as in FIG. 1 and will not be discussed further.

Figure 24:
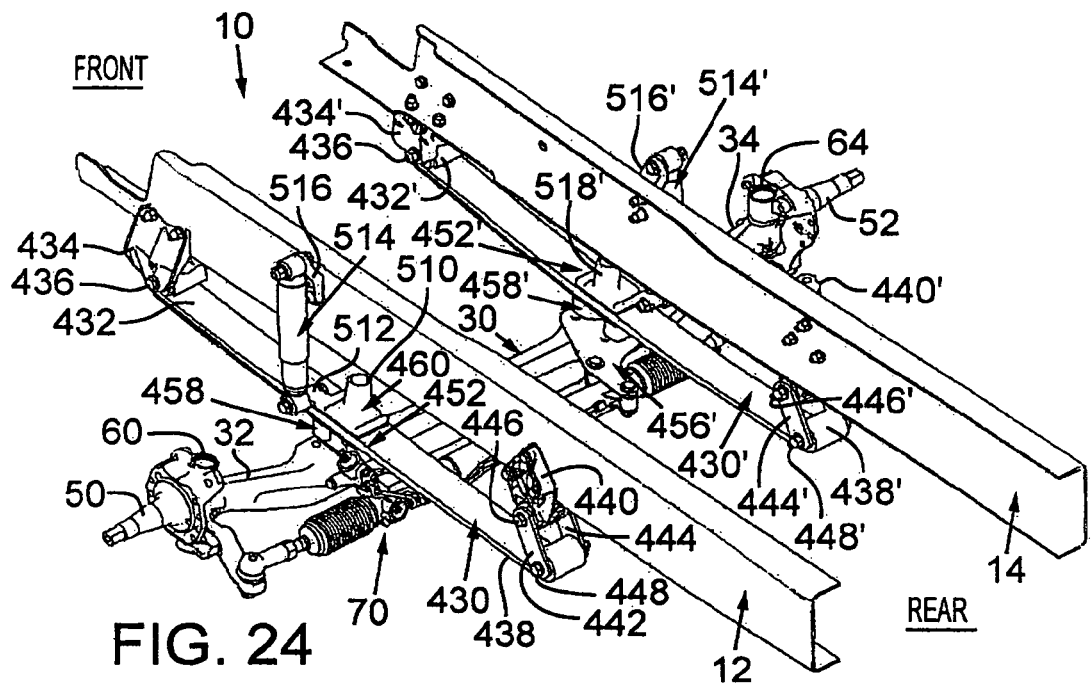
FIG. 24 is a perspective view of a further embodiment of a suspension with a rack-and-pinion steerer.
Figure 25:
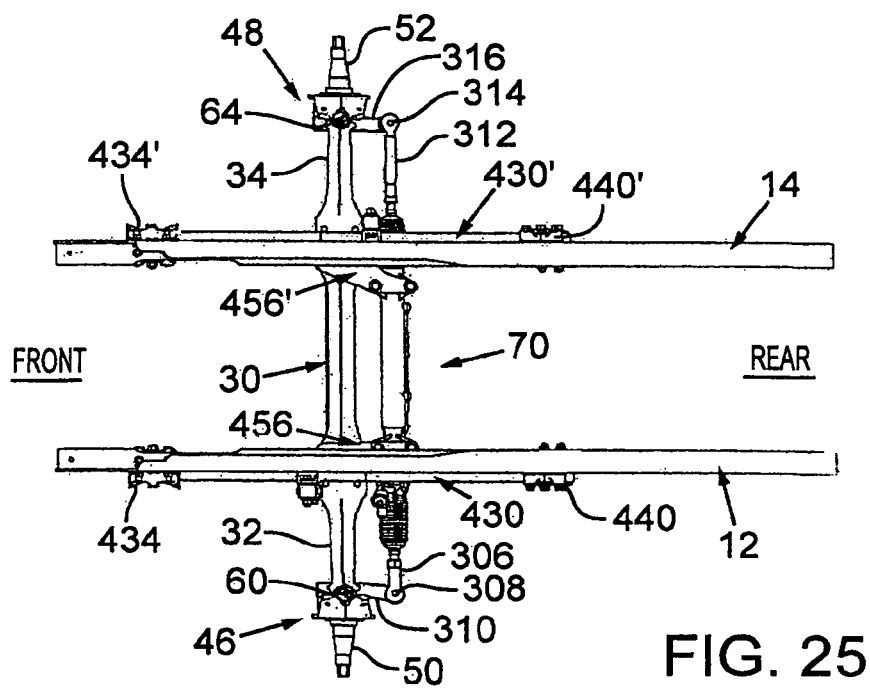
FIG. 25 is a top view of the embodiment of FIG. 24.

In the embodiment of these figures, the end portion 32 of axle 30 is suspended from frame rail 12 by a first leaf spring 430. In addition, the end portion 34 of axle 30 is suspended from axle 14 by a second leaf spring 430'. Since the two suspensions are similar to one another, only the suspension including leaf spring 430 will be described in detail. Components included in the suspension with leaf spring 430' have been assigned the same numbers as those for the corresponding components of the suspension that includes leaf spring 430 except with a prime (') designation. The leaf springs 430,430' may include one or more leaves although the embodiment of FIG. 24 illustrates a leaf spring with a single leaf.

Leaf spring 430 has a forward end portion 432 which is pivotally coupled to a bracket 434 for pivoting about an axis defined by a pin 436. Pin 436 may support a bushing about which the end of leaf 430 is wrapped. Bracket 434 is coupled to the frame rail 12 at a location forwardly of axle 30.

The rear end portion 438 of leaf spring 430 is pivotally coupled to frame rail 12 at a location which is rearwardly of the axle and rearwardly of the rack-and-pinion steerer 70. In the embodiment of FIG. 24, a mounting bracket 440 is coupled to frame rail 12. First and second downwardly projecting links 442,444 are pivotally coupled to bracket 440 for pivoting about a pivot axis defined by a pin 446. The lower end portions of links 442,444 are pivotally coupled to leaf spring end portion 438 by a pin 448 for pivoting about a second pivot axis below the pivot axis defined by pin 446. Pin 448 may support a bushing with the rear end of leaf spring 430 being wrapped around the bushing to couple these components together.

The central portion 452 of leaf spring 430 is desirably coupled to the axle end portion 32 and may be clamped to the axle. As best seen in FIG. 26, a first mounting bracket 456 in this embodiment has upper and lower surfaces with the lower surface overlaying an upper surface of a portion of axle end portion 32. A spacer 458, which may be of a Z-shape configuration as shown in FIG. 26, although other shapes are suitable, is positioned on the upper surface of mounting bracket 456. The undersurface of a central portion of leaf spring 430 overlies the spacer 458. A top clamping member 460 engages the upper surface of leaf spring 430 and more particularly a portion of the upper surface of the central portion of the leaf spring.

Fasteners such as first and second U-shape clamping bolts 462,464 may rest in respective upwardly opening grooves of clamping member 460. It should be noted in FIG. 24 that the clamping bolts 462,464 have been omitted for clarity. One leg (the inboard leg) of fastener 462 passes through an opening 466 (FIG. 27) in mount 456 and through a leg receiving opening 468 (FIG. 26) in axle 30. The outboard leg of bolt 462 passes through an opening 470 in the axle. In addition, the inboard leg of bolt 464 passes through opening 472 in bracket 456 and through an opening 474 in the axle. The outboard leg of bolt 464 passes through an opening 476 in the axle. Nuts on the underside of the axle secure the bolts and the assembly in place. A locating hole 482 (FIG. 27) extends through bracket 456 for receiving a fastener inserted through hole 482 and a corresponding locating hole 484 in axle 30. A centering hole 486 (FIG. 27) is also provided in base 456. Hole 486 is aligned with a centering hole or opening 488 in axle 30. In addition, centering openings 490,492 and 494 in the respective spacer 458, leaf spring 430 and clamping member 460 are provided and are aligned with openings 486 and 488 when the assembly is complete. A fastener, such as a bolt, may be inserted through these centering openings and through the axle. The cooperation of locating holes 482,484 and the centering holes 486,488,490,492 and 494 when fastened by their associated fasteners provide a tight tolerance for the mounting of bracket 456 to the axle and thus for mounting the rack-and-pinion steerer 70 via the bracket 456 to the axle. That is, fasteners such as bolts inserted through openings 496,498 in bracket 456 and through openings 500,502 of rack-and-pinion steerer 70 mount the rack-and-pinion steerer to the base 456 and thus to the axle. Desirably, the tolerance of the location of the center of the centering holes including holes 486,488 is plus or minus 0.5 mm. In addition, desirably the tolerance of the location of the center of locating hole 484 is plus or minus 0.1 mm. In addition, these holes have a diameter that is desirably within plus or minus 0.25 mm of their specified diameters. This same tolerance may also be provided for locating hole 482' and centering hole 486' of bracket 456' (FIG. 28) and for the corresponding locating and centering holes 484' and 488' of the axle.

The illustrated form of upper clamping member 494 includes an upwardly projecting stop portion 510 which may engage the undersurface of frame rail 12 (FIG. 24) to limit the extent of downward deflection of the leaf spring 430. In addition, clamping member 494 may include a shock absorber mount portion 512. In the embodiment of FIG. 26, shock absorber mount 512 is positioned forwardly of the axis about which a wheel mounted to axle end portion 46 rotates.

Figure 29:
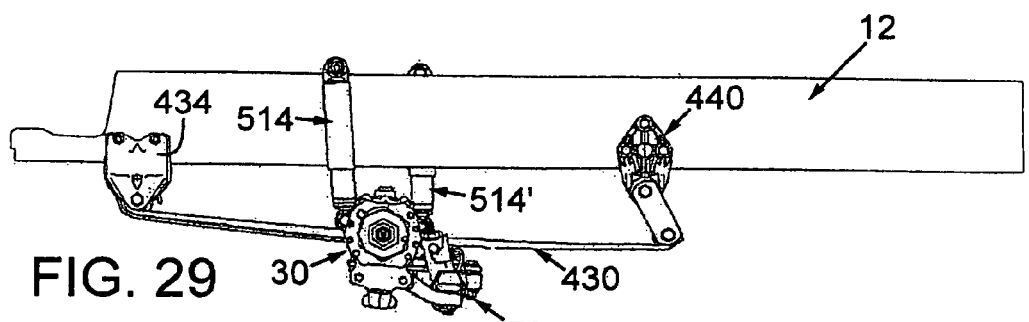
FIG. 29 is a side elevational view of the embodiment of FIG. 24.

As can be seen in FIG. 24, a shock absorber 514 may be positioned with a lower end portion pivotally coupled to shock absorber mounting portion 512. An upper end portion of the shock absorber may be pivotally coupled to a mounting bracket 516 which is coupled to the frame rail 12 and more specifically mounted to the outboard side surface of the frame rail. As can be seen in FIG. 26, the shock absorber mount 512' of clamping member 464' is shown at a position rearwardly of the axle 30. A lower end portion of a shock absorber 514' is pivotally coupled to mounting portion 512'. The upper end portion of shock absorber 514' is coupled by a bracket 516' to the frame rail 14. Thus, with this construction, as can be seen in FIG. 29, shock absorber 514 is positioned forwardly of the wheel axis while shock absorber 514' is positioned rearwardly of the wheel axis. Alternatively, these shock absorbers may be mounted in different locations with, for example, both shock absorbers being positioned forwardly of the wheel axis.

Figure 30:
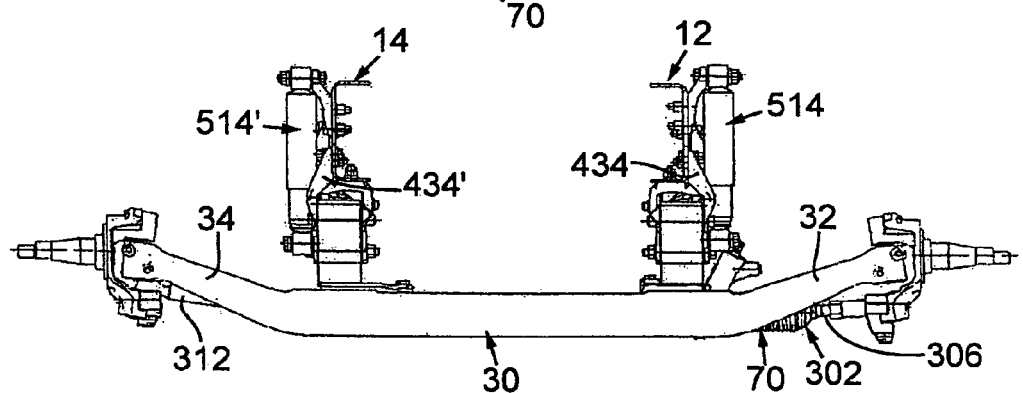
FIG. 30 is a front view of the embodiment of FIG. 24.
Figure 31:
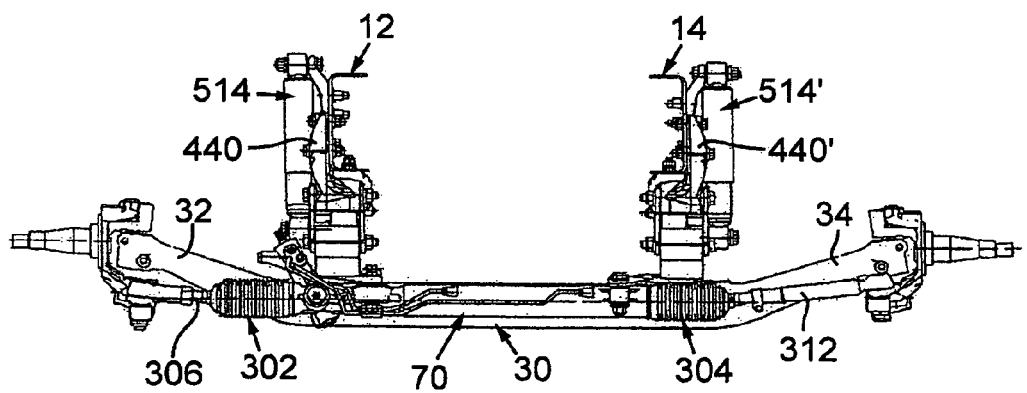
FIG. 31 is a rear view of the embodiment of FIG. 24.

As can be seen in FIGS. 30 and 31, in this construction as well as in the earlier embodiments, desirably the wheel steerer 70 is shielded from the front by the axle except for the outermost end portions of the wheel steerer such as portions of rod end 312, rod end 306, and a portion of the boot of end portion 302.

Having illustrated and described the principles of our invention with reference to several embodiments, it should be apparent to those of ordinary skill in the art that these embodiments may be modified in arrangement and detail without departing from the inventive principals. We claim as our invention all such modifications as fall within the scope and spirit of the following claims.

We claim:

1. A vehicle comprising a solid axle and first and second spaced apart elongated frame rail members from which the axle is suspended, the axle extending in a transverse direction relative to the first and second frame rail members, at least one cross-member interconnecting the first and second frame rail members at a location forwardly of the axle, a suspension for the axle of the vehicle comprising:

a first elongated support comprising a first end portion pivotally coupled to the first frame rail member at a location rearwardly of the axle and comprising a second end portion extending forwardly of the axle, the first elongated support also being coupled to the axle;

a first air spring coupled to the first frame rail member and to the first elongated support, the first air spring having a center which is positioned at a location forwardly of the axle;

a stabilizer member comprising a first end portion coupled to the second end portion of the first elongated support and a second end portion coupled to the cross-member at a location nearer to the second frame rail member than to the first frame rail member;

a second elongated support comprising a first end portion pivotally coupled to the second frame rail member at a location rearwardly of the axle and comprising a second end portion extending forwardly of the axle, the second elongated support being coupled to the axle; and a second air spring coupled to the second frame rail member and to the second elongated support, the second air spring having a center which is positioned at a location forwardly of the axle.

2. An apparatus according to claim 1 wherein the first and second elongated supports are each of a unitary one-piece monolithic construction.

3. An apparatus according to claim 1 wherein the first end portion of the first elongated support is pivotally coupled to the first frame rail member so as to pivot relative to the first frame rail member about only a first pivot axis and such that the first end portion of the first elongated support does not move forwardly or rearwardly in the longitudinal direction of the first frame rail, and wherein the first end portion of the second elongated support is pivotally coupled to the second frame rail member so as to pivot relative to the second frame rail member about only a second pivot axis and such that the first end portion of the second elongated support does not move forwardly or rearwardly in the longitudinal direction of the second frame rail.

4. An apparatus according to claim 3 comprising a first bracket rigidly mounted to the first frame rail member and projecting downwardly from the first frame rail member, the first bracket having a first bracket distal end portion spaced from the first frame rail member, the first end portion of the first elongated support being pivotally coupled by a pivot pin to the first bracket distal end portion so as to pivot about only the first pivot axis relative to the first bracket and thereby relative to the first frame rail member, the suspension further comprising a second bracket rigidly mounted to the second frame rail member and projecting downwardly from the second frame rail member, the second bracket having a second bracket distal end portion spaced from the second frame rail member, the second end portion of the second elongated support being pivotally coupled by a pivot pin to the second bracket distal end portion so as to pivot about only the second pivot axis relative to the second bracket and thereby relative to the second frame rail member.

5. An apparatus according to claim 1 in which the vehicle comprises first and second wheels rotatably coupled to respective end portions of the axle for rotation as the vehicle moves, the first and second wheels also being pivotally coupled to the respective end portions of axle for pivoting relative to the axle about respective upright steering axes to steer the vehicle, the apparatus further comprising a rack-and-pinion wheel steerer mounted to the axle and comprising first and second rack-and-pinion end portions respectively coupled to the respective first and second wheels, the rack-and-pinion steerer being operable to selectively shift the first and second rack-and-pinion end portions in a first direction to pivot the wheels about the respective steering axes in one direction, and the rack-and-pinion steerer being operable to selectively shift the first and second rack-and-pinion end portions in a direction opposite to the first direction to pivot the wheels about the respective steering axes in a second direction opposite to said one direction.

6. An apparatus according to claim 1 wherein the stabilizer member couples the second end portion of the first elongated support to the cross member and does not couple the second end portion of the second elongated support to the cross member.

7. A vehicle comprising a solid axle and first and second spaced apart elongated frame rail members from which the axle is suspended, the axle extending in a transverse direction relative to the first and second frame rail members, at least one cross-member interconnecting the first and second frame rail members at a location forwardly of the axle, a suspension for the axle of the vehicle comprising:

a first elongated support comprising a first end portion pivotally coupled to the first frame rail member at a location rearwardly of the axle and comprising a second end portion extending forwardly of the axle, the first elongated support also being coupled to the axle;

a first air spring coupled to the first frame rail member and to the first elongated support, the first air spring having a center which is positioned at a location forwardly of the axle;

a stabilizer member coupling the second end portion of the first elongated support to the cross-member;

a second elongated support comprising a first end portion pivotally coupled to the second frame rail member at a location rearwardly of the axle and comprising a second end portion extending forwardly of the axle, the second elongated support being coupled to the axle;

a second air spring coupled to the second frame rail member and to the second elongated support, the second air spring having a center which is positioned at a location forwardly of the axle; and wherein the first elongated support extends forwardly to a greater extent than the second elongated support.

8. An apparatus according to claim 7, wherein the stabilizer member comprises a first end portion coupled to the second end portion of the first elongated support and a second end portion coupled to the cross-member at a location nearer to the second frame rail member than to the first frame rail member.

9. A vehicle comprising:

a solid axle extending at least between first and second frame rail members;

first and second wheels rotatably coupled to respective end portions of the axle for rotation as the vehicle moves, the first and second wheels also being pivotally coupled to the respective end portions of the axle for pivoting about respective upright steering axes and relative to the axle to steer the vehicle;

a rack-and-pinion wheel steerer mounted to the axle and comprising first and second rack-and-pinion end portions respectively coupled to the respective first and second wheels, the rack-and-pinion steerer being supported and sized so as to be positioned behind the axle and so as to be substantially shielded from the front by the-axle, the rack-and-pinion wheel steerer being operable to selectively shift the first and second rack-and-pinion end portions in a first direction to pivot the wheels in one direction about respective upright steering axes, and the rack-and-pinion steerer also being operable to selectively shift the first and second rack-and-pinion end portions in a second direction opposite to the first direction to pivot the wheels about respective upright steering axes in a direction opposite to said one direction; and first and second spaced apart rack-and-pinion mounts, each rack-and-pinion mount comprising a base portion comprising an axle mounting flange portion for mounting to the axle and a projecting portion extending rearwardly from the axle, the rack-and-pinion steerer being supported by the projecting portions of the first and second rack-and-pinion mounts.

10. A vehicle comprising a solid axle extending at least between first and second frame rail members, first and second wheels rotatably coupled to respective end portions of the axle for rotation as the vehicle moves, the first and second wheels also being pivotally coupled to the respective end portions of the axle for pivoting about respective upright steering axes and relative to the axle to steer the vehicle, a rack-and-pinion wheel steerer mounted to the axle and comprising first and second rack-and-pinion end portions respectively coupled to the respective first and second wheels, the rack-and-pinion wheel steerer being operable to selectively shift the first and second rack-and-pinion end portions in a first direction to pivot the wheels in one direction about respective upright steering axes, and the rack-and-pinion steerer also being operable to selectively shift the first and second rack-and-pinion end portions in a second direction opposite to the first direction to pivot the wheels about respective upright steering axes in a direction opposite to said one direction;

first and second spaced apart rack-and-pinion mounts, each rack-and-pinion mount comprising a base portion for mounting to the axle and a projecting portion extending rearwardly from the axle, the rack-and-pinion steerer being supported by the projecting portions of the first and second rack-and-pinion mounts; and wherein each of the rack-and-pinion mounts comprises a shock absorber supporting portion projecting forwardly of the axle, the apparatus further comprising a first shock absorber having a first shock absorber end portion coupled to the first frame rail member and a second shock absorber end portion coupled to the shock absorber supporting portion of the first rack-and-pinion mount, and a second shock absorber having a first shock absorber end portion coupled to the second frame rail member and a second shock absorber end portion coupled to the shock absorber supporting portion of the second rack-and-pinion mount.

11. A vehicle comprising a solid axle extending at least between first and second frame rail members, first and second wheels rotatably coupled to respective end portions of the axle for rotation as the vehicle moves, the first and second wheels also being pivotally coupled to the respective end portions of the axle for pivoting about respective upright steering axes and relative to the axle to steer the vehicle, a rack-and-pinion wheel steerer mounted to the axle and comprising first and second rack-and-pinion end portions respectively coupled to the respective first and second wheels, the rack-and-pinion wheel steerer being operable to selectively shift the first and second rack-and-pinion end portions in a first direction to pivot the wheels in one direction about respective upright steering axes, and the rack-and-pinion steerer also being operable to selectively shift the first and second rack-and-pinion end portions in a second direction opposite to the first direction to pivot the wheels about respective upright steering axes in a direction opposite to said one direction;

first and second spaced apart rack-and-pinion mounts, each rack-and-pinion mount comprising a base portion for mounting to the axle and a projecting portion extending rearwardly from the axle, the rack-and-pinion steerer being supported by the projecting portions of the first and second rack-and-pinion mounts; and wherein each mount further comprises a coupler with an air spring supporting portion.

12. A vehicle comprising a solid axle extending at least between first and second frame rail members, first and second wheels rotatably coupled to respective end portions of the axle for rotation as the vehicle moves, the first and second wheels also being pivotally coupled to the respective end portions of the axle for pivoting about respective upright steering axes and relative to the axle to steer the vehicle, a rack-and-pinion wheel steerer mounted to the axle and comprising first and second rack-and-pinion end portions respectively coupled to the respective first and second wheels, the rack-and-pinion steerer being supported and sized so as to be positioned behind the axle and so as to be substantially shielded from the front by the-axle, the rack-and-pinion wheel steerer being operable to selectively shift the first and second rack-and-pinion end portions in a first direction to pivot the wheels in one direction about respective upright steering axes, and the rack-and-pinion steerer also being operable to selectively shift the first and second rack-and-pinion end portions in a second direction opposite to the first direction to pivot the wheels about respective upright steering axes in a direction opposite to said one direction; and further comprising first and second connector members each comprising a first end portion coupled to a respective one of the end portions of the axle and a second end portion coupled to a respective one of the first and second rack-and-pinion end portions, and wherein each of the second end portions of the first and second connector members is located below the respective first and second rack-and-pinion end portions.

* * * * *